(12) United States Patent
Matsumura et al.

(10) Patent No.: US 12,526,820 B2
(45) Date of Patent: Jan. 13, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 359 days.

(21) Appl. No.: 18/247,112

(22) PCT Filed: Sep. 30, 2020

(86) PCT No.: PCT/JP2020/037260
§ 371 (c)(1),
(2) Date: Mar. 29, 2023

(87) PCT Pub. No.: WO2022/070346
PCT Pub. Date: Apr. 7, 2022

(65) Prior Publication Data
US 2023/0379936 A1    Nov. 23, 2023

(51) Int. Cl.
H04W 72/23    (2023.01)
H04W 72/232   (2023.01)

(52) U.S. Cl.
CPC .................. *H04W 72/232* (2023.01)

(58) Field of Classification Search
None
See application file for complete search history.

(56) References Cited

U.S. PATENT DOCUMENTS

| | | | |
|---|---|---|---|
| 2021/0195601 A1* | 6/2021 | Khoshnevisan | H04W 72/53 |
| 2021/0399840 A1* | 12/2021 | Yi | H04L 1/1812 |
| 2022/0095304 A1 | 3/2022 | Muruganathan et al. | |
| 2022/0166541 A1* | 5/2022 | Takeda | H04L 1/1864 |
| 2022/0394751 A1* | 12/2022 | Myung | H04L 5/00 |

FOREIGN PATENT DOCUMENTS

| | | |
|---|---|---|
| WO | 2020031335 A1 | 2/2020 |
| WO | 2020144639 A1 | 7/2020 |

OTHER PUBLICATIONS

Office Action issued in Japanese Application No. 2022-553340, mailed Sep. 3, 2024 (13 pages).

(Continued)

*Primary Examiner* — Kodzovi Acolatse
(74) *Attorney, Agent, or Firm* — Osha Bergman Watanabe & Burton LLP

(57) ABSTRACT

A terminal according to an aspect of the present disclosure includes a receiving section that receives TCI state information indicating a plurality of transmission configuration indication (TCI) states applicable to a plurality of kinds of channels and receives downlink control information, and a control section that determines one of the plurality of TCI states on the basis of the downlink control information and does not use the downlink control information for scheduling a channel. According to an aspect of the present disclosure, the information related to QCL can be appropriately determined.

4 Claims, 23 Drawing Sheets

(56) References Cited

OTHER PUBLICATIONS

Nokia, Nokia Shanghai Bell: "On Enhanced UL Configured Grant Transmission for NR URLLC"; 3GPP TSG RAN WG1 Meeting #97, R1-1906757; Reno, NV, USA, May 13-17, 2019 (10 pages).
Office Action issued in Japanese Application No. 2022-553340, mailed Jan. 28, 2025 (11 pages).
International Search Report issued in PCT/JP2020/037260 on May 11, 2021 (3 pages).
Written Opinion of the International Searching Authority issued in PCT/JP2020/037260 on May 11, 2021 (4 pages).
ZTE; "Enhancements on Multi-beam Operation"; 3GPP TSG RAN WG1 Meeting #102-e, R1-2005454; e-Meeting; Aug. 17-28, 2020 (12 pages).
MediaTek Inc.; "Enhancements on multi-TRP/panel transmission"; 3GPP TSG RAN WG1 #99, R1-1912134; Reno, USA; Nov. 18-22, 2019 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).

\* cited by examiner

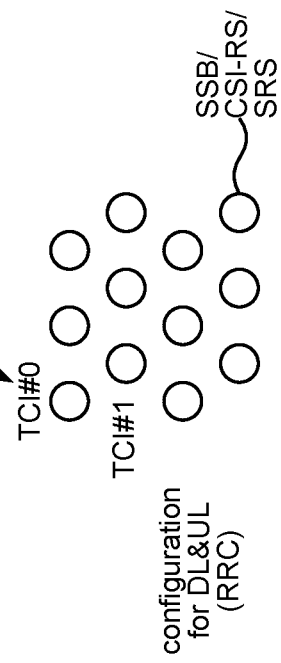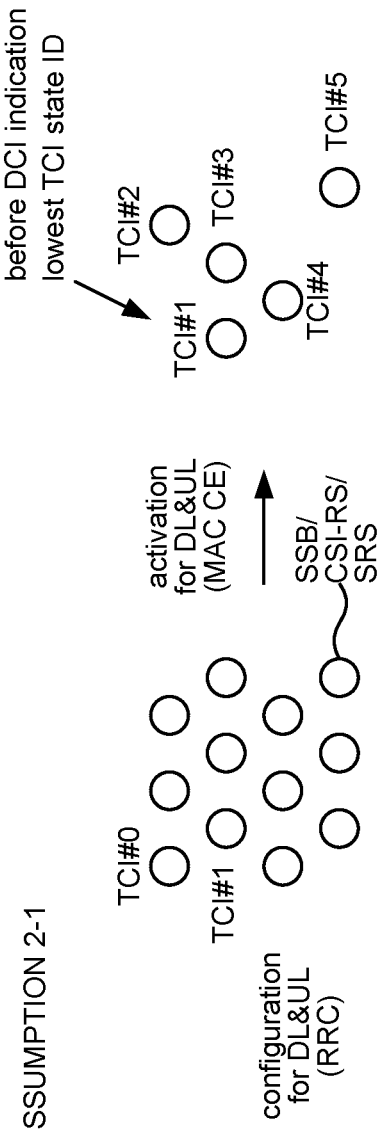
FIG. 8A
FIG. 8B

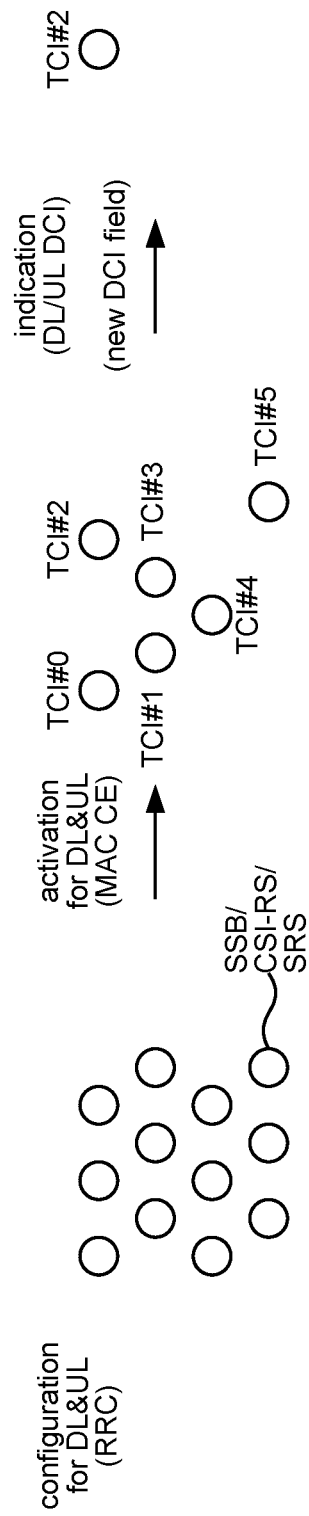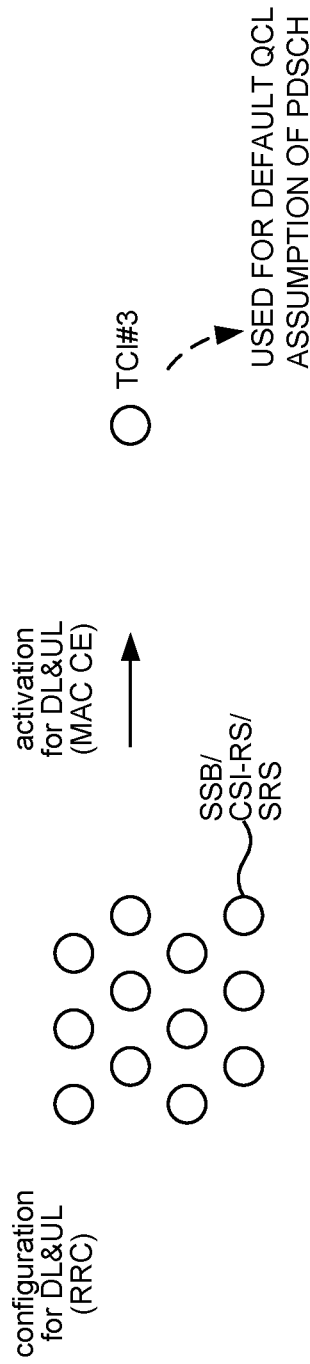

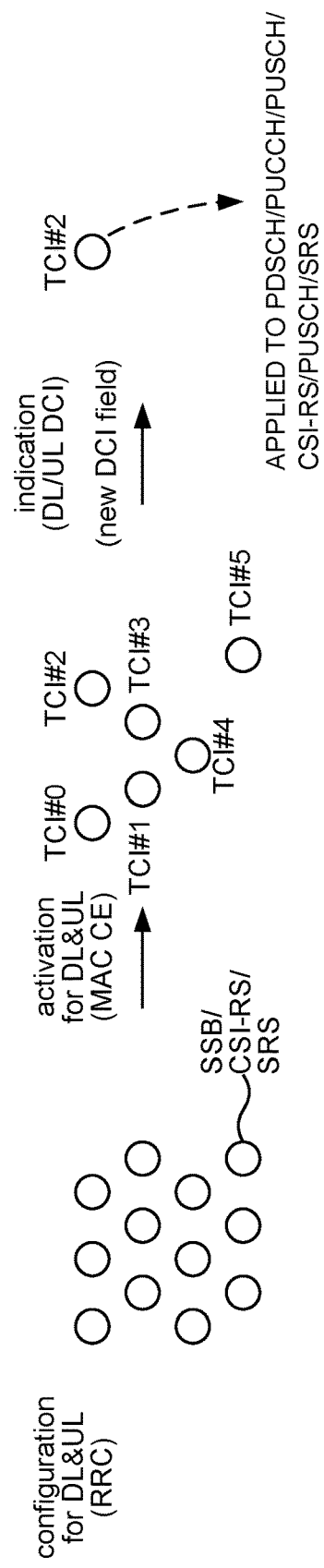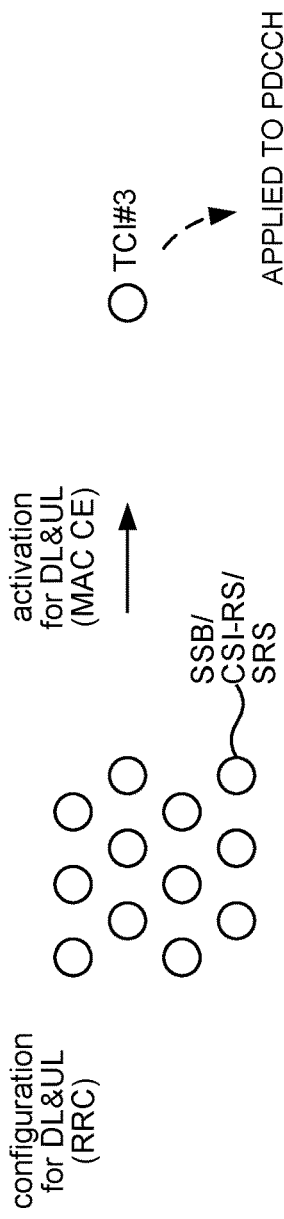
FIG. 16A COMMON TCI STATE POOL #1 FOR DCI LEVEL INDICATION
FIG. 16B COMMON TCI STATE POOL #2 FOR MAC CE LEVEL INDICATION

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication system (for example, NR), it is studied that a user terminal (terminal, User Equipment (UE)) controls transmission/reception processing on the basis of information related to Quasi-Co-Location (QCL) (QCL assumption/Transmission Configuration Indication (TCI) state/spatial relation).

However, the information related to QCL is not clear in some cases. If the information related to QCL is not clear, communication quality reduction, throughput reduction, or the like may be involved.

In view of this, an object of the present disclosure is to provide a terminal, a radio communication method, and a base station capable of appropriately determining information related to QCL.

Solution to Problem

A terminal according to an aspect of the present disclosure includes a receiving section that receives TCI state information indicating a plurality of transmission configuration indication (TCI) states applicable to a plurality of kinds of channels and receives downlink control information, and a control section that determines one of the plurality of TCI states on the basis of the downlink control information and does not use the downlink control information for scheduling a channel.

Advantageous Effects of Invention

According to an aspect of the present disclosure, the information related to QCL can be appropriately determined.

BRIEF DESCRIPTION OF DRAWINGS

FIGS. 8A and 8B are diagrams to show examples of Assumptions 1-1 and 1-2;

FIGS. 14A and 14B are diagrams to show examples of a unified TCI state pool in Aspect 2-4;

FIGS. 16A and 16B are diagrams to show examples of Variation 1 of Aspect 2-4;

Figure 1:
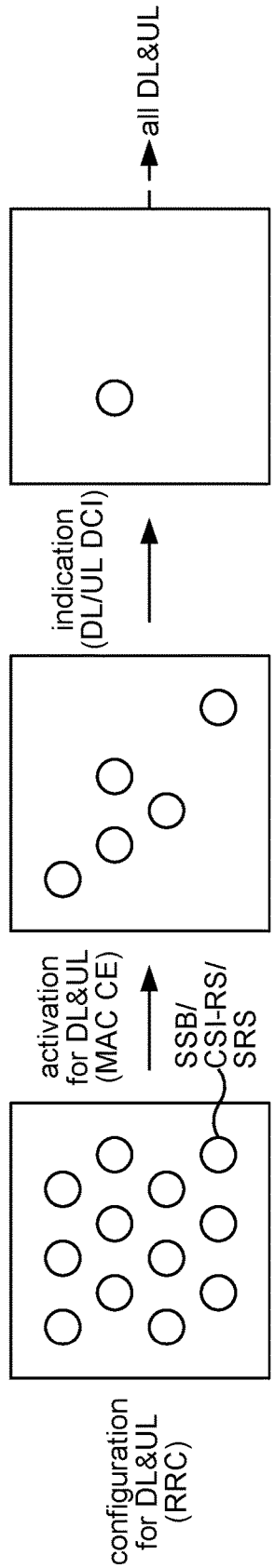
FIG. 1 is a diagram to show an example of a common beam for both DL and UL.

DESCRIPTION OF EMBODIMENTS (TCI, Spatial Relation, QCL)

For NR, a study is underway to control reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE on the basis of a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a control resource set (CORESET), channel, or reference signal has a specific QCL (for example, QCL type D) relation with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or the spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relation with the channel may be, for example, at least one of a synchronization signal block (SSB), a channel state information reference signal (CSI-RS), a reference signal for measurement (sounding reference signal (SRS)), a tracking CSI-RS (also referred to as a tracking reference signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

A QCL type X RS in a TCI state may mean an RS having a QCL type X relation with (a DMRS of) a channel/signal, and the RS may be referred to as a QCL source for the QCL type X in the TCI state.

(Pathloss RS)

A pathloss $PL_{b,f,c}(q_d)$ [dB] in transmission power control for each of a PUSCH, a PUCCH, and an SRS is calculated by the UE using an index $q_d$ of a reference signal (RS, pathloss reference RS (PathlossReferenceRS)) for downlink BWP associated with an active UL BWP b of a carrier f of a serving cell c. In the present disclosure, a pathloss RS, a pathloss (PL)-RS, an index $q_d$, an RS used for pathloss calculation, and an RS resource used for pathloss calculation may be interchangeably interpreted. In the present disclosure, calculation, estimation, measurement, and tracking may be interchangeably interpreted.

A study is underway whether to change an existing mechanism of a higher layer filtered RSRP for the pathloss measurement in a case that the pathloss RS is updated by the MAC CE.

In the case that the pathloss RS is updated by the MAC CE, pathloss measurement on the basis of an L1-RSRP may be applied. The higher layer filtered RSRP may be used for the pathloss measurement at an available timing after the MAC CE for update of the pathloss RS, and the L1-RSRP may be used for the pathloss measurement before the higher layer filtered RSRP is applied. The higher layer filtered RSRP may be used for the pathloss measurement at an available timing after the MAC CE for update of the pathloss RS, and a higher layer filtered RSRP for a pathloss RS before that may be used before the timing. Similar to the operation in Rel. 15, the higher layer filtered RSRP may be used for the pathloss measurement, and the UE may track all pathloss RS candidates configured by the RRC. The maximum number of pathloss RSs configurable by the RRC may depend on UE capability. In a case that the maximum number of pathloss RSs configurable by the RRC is X, not more than X pathloss RS candidates may be configured by the RRC, and a pathloss RS may be selected by the MAC CE from among the configured pathloss RS candidates. The maximum number of pathloss RSs configurable by the RRC may be 4, 8, 16, 64, or the like.

In the present disclosure, a higher layer filtered RSRP, and a filtered RSRP, layer 3 filtered RSRP may be interchangeably interpreted.

(Default TCI State/Default Spatial Relation/Default PL-RS)

In an RRC connected mode, in both a case that the information of TCI in DCI (higher layer parameter "TCI-PresentInDCI") is set as "enabled" and a case that the TCI information in the DCI is not configured, in a case that a time offset between reception of the DL DCI (the DCI scheduling the PDSCH) and the corresponding PDSCH (the PDSCH scheduled by the DCI) is less than a threshold (timeDurationForQCL) (application condition, first condition), in a case of non cross-carrier scheduling, the TCI state of the PDSCH (default TCI state) may be the TCI state having the lowest CORESET ID in the most recent slot in the active DL BWP of a CC thereof (of a specific UL signal). Not in the above case, the TCI state of the PDSCH (default TCI state) may be the TCI state having the lowest TCI state ID of the PDSCH in the active DL BWP of the scheduled CC.

In Rel. 15, the individual MAC CE, a PUCCH spatial relation activation/deactivation MAC CE and an SRS spatial relation activation/deactivation MAC CE, are needed. The PUSCH spatial relation conforms to the SRS spatial relation.

In Rel. 16, at least one of the PUCCH spatial relation activation/deactivation MAC CE and the SRS spatial relation activation/deactivation MAC CE may not be used.

If both the spatial relation and the PL-RS for a PUCCH are not configured in FR2 (application condition, second condition), default assumptions for the spatial relation and the PL-RS (a default spatial relation and a default PL-RS) are applied to the PUCCH. If both the spatial relation and the PL-RS for an SRS (an SRS resource for the SRS, or an SRS resource corresponding to SRI in DCI format 0_1 scheduling the PUSCH) are not configured in FR2 (application condition, second condition), default assumptions for the spatial relation and the PL-RS (a default spatial relation and a default PL-RS) are applied to the PUSCH scheduled by DCI format 0_1 and the SRS.

If a CORESET is configured in the active DL BWP on the CC (application condition), the default spatial relation and the default PL-RS may be the TCI state or QCL assumption of the CORESET having the lowest CORESET ID in the active DL BWP. If a CORESET is not configured in the active DL BWP on the CC, the default spatial relation and the default PL-RS may be an active TCI state having the lowest ID of the PDSCH in the active DL BWP.

In Rel. 15, the spatial relation of a PUSCH scheduled by DCI format 0_0 conforms to a spatial relation of a PUCCH resource having the lowest PUCCH resource ID among the PUCCH active spatial relations on the same CC. The network is required to update the PUCCH spatial relations on all SCells even in a case that a PUCCH is not transmitted on the SCells.

In Rel. 16, a PUCCH configuration for the PUSCH scheduled by DCI format 0_0 is not required. In a case that there is no active PUCCH spatial relation or no PUCCH resource for the PUSCH scheduled by DCI format 0_0 on the active UL BWP in the CC (application condition, second condition), the default spatial relation and the default PL-RS are applied to the PUSCH.

An application condition of a default spatial relation/default PL-RS for the SRS may include a default beam pathloss enabling information element for SRS (higher layer parameter "enableDefaultBeamPlForSRS") being set to be enabled. An application condition of a default spatial relation/default PL-RS for the PUCCH may include a default beam pathloss enabling information element for PUCCH (higher layer parameter "enableDefaultBeamPlForPUCCH") being set to be enabled. An application condition of the default spatial relation/default PL-RS for the PUSCH scheduled by DCI format 0_0 may include a default beam pathloss enabling information element for the PUSCH scheduled by DCI format 0_0 (higher layer parameter "enableDefaultBeamPlForPUSCH0_0") being set to be enabled.

The threshold described above may be referred to as a QCL time length (time duration), "timeDurationForQCL," "Threshold", "Threshold for offset between a DCI indicating a TCI state and a PDSCH scheduled by the DCI," "Threshold-Sched-Offset," a schedule offset threshold, a scheduling offset threshold, and the like.

(Unified/Common TCI Framework)

According to a unified TCI framework, the UL and DL channels can be controlled by a common framework. In the unified TCI framework, rather than defining the TCI state or the spatial relation per channel, unlike in Rel. 15, a common beam is indicated and the common beam may be applied to all UL and DL channels, or a common beam for UL may be applied to all UL channels and a common beam for DL may be all DL channels.

One common beam for both the DL and the UL, or the common beam for DL and the common beam for UL (two common beams in total) are under study.

The UE may assume the same TCI state (joint TCI state, joint TCI state pool, joint common TCI state pool) for UL and DL.

In an example in FIG. 1, the RRC configures a plurality of TCI states (joint common TCI state pool) for both DL and UL. Each of the plurality of TCI states may be an SSB, a CSI-RS, or an SRS. The MAC CE may activate some of the plurality of configured TCI states. The DCI may indicate at least one of the plurality of activated TCI states.

UL and DL default beams may be aligned by beam management based on the MAC CE (MAC CE level beam indication). The default TCI state of the PDSCH may be updated to match the default UL beam (spatial relation).

The common beam/unified TCI state may be indicated by beam management based on the DCI (DCI level beam indication) from the same TCI state pool (joint common TCI state pool) for both UL and DL. M (>1) TCI states may be activated by the MAC CE. The UL/DL DCI may select one from M active TCI states. The selected TCI state may be applied to the channel/RS for both UL and DL.

The UE may assume different TCI states for respective UL and DL (separate TCI state, separate TCI state pool, UL separate TCI state pool and DL separate TCI state pool, separate common TCI state pool, UL common TCI state pool and DL common TCI state pool).

Figure 2:
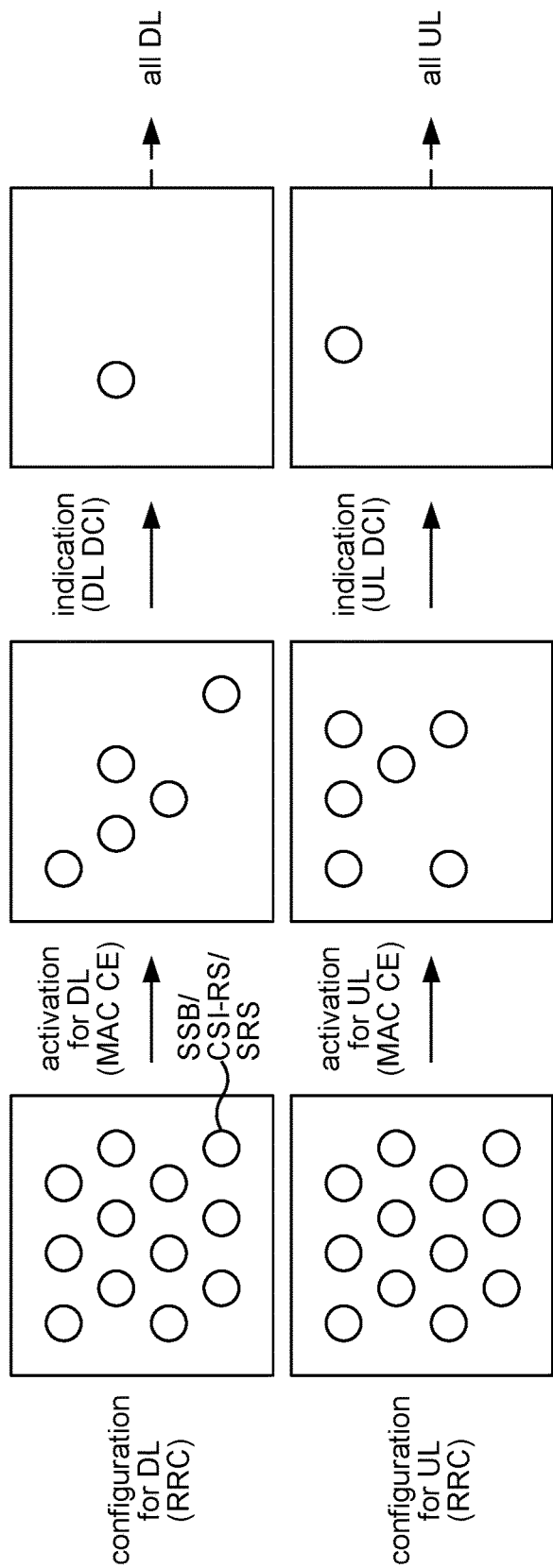
FIG. 2 is a diagram to show examples of a common beam for DL and common beam for UL.

In an example in FIG. 2, the RRC (parameter, information element) may configure a plurality of TCI states (pool) for each of the UL and DL channels.

The MAC CE may select (activate) one or more (for example, a plurality of) TCI states (set) for each of the UL and DL channels. The MAC CE may activate two sets of TCI states.

The DL DCI may select (indicate) one or more TCI states (for example, one TCI state). The TCI state may be applied to one or more DL channels. The DL channel may be PDCCH/PDSCH/CSI-RS. The UE may use the operation for the TCI state (TCI framework) in Rel. 16 to determine a TCI state of each DL channel/RS.

The UL DCI may select (indicate) one or more TCI states (for example, one TCI state). The TCI state may be applied to one or more UL channels. The UL channel may be PUSCH/SRS/PUCCH.

As a use case of the separate common TCI state pool, the following use cases 0, 1, and 2 are under study.

[Use Case 0]

The UE uses different UL beams due to maximum permitted exposure (MPE).

Figure 3:
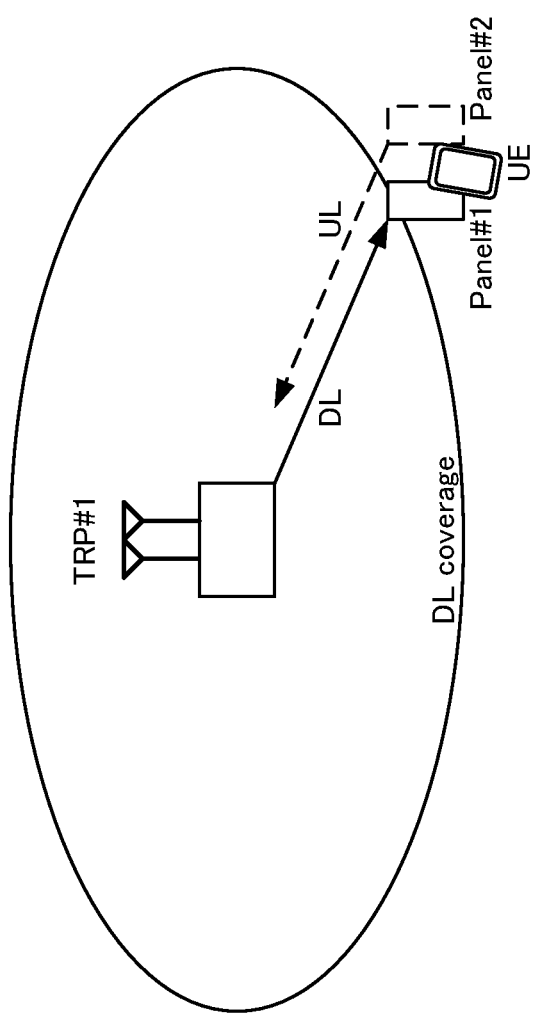
FIG. 3 is a diagram to show an example of a use case 0.

In an example in FIG. 3, the UL in panel #1 receives a MPE problem, and the UE uses panel #2 for UL.

[Use Case 1]

The UE uses different UL beams due to a UL signal strength.

Figure 4:
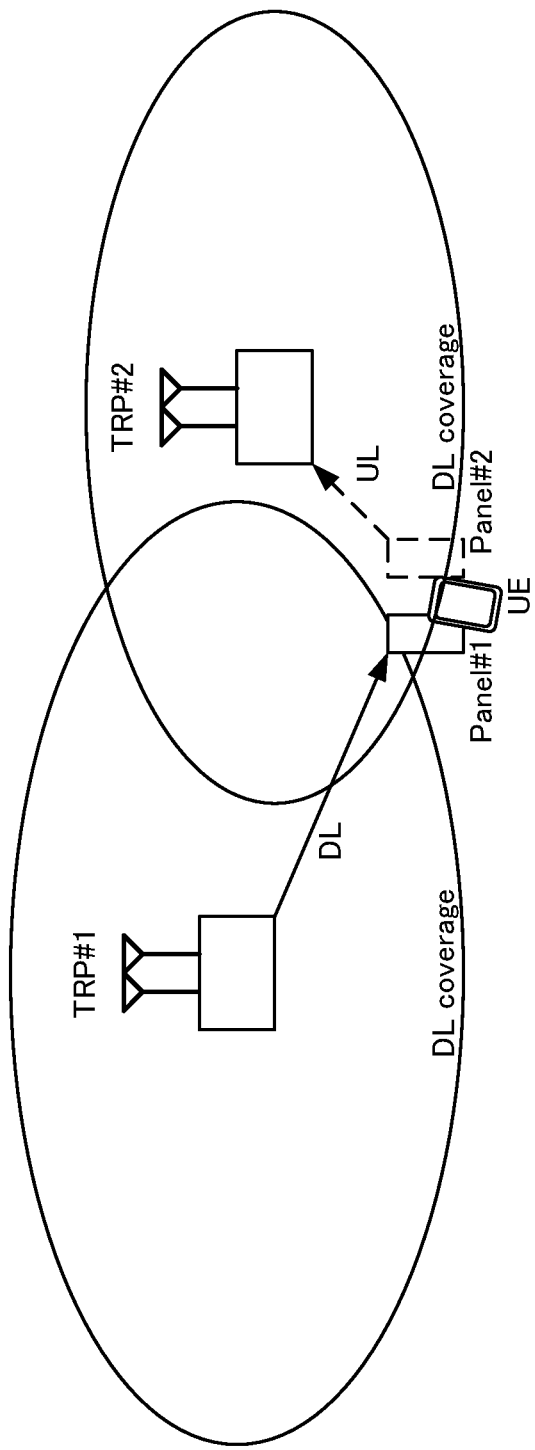
FIG. 4 is a diagram to show an example of a use case 1.

In an example in FIG. 4, a distance between the UE and TRP (cell, base station) #1 is longer than a distance between the UE and TRP #2. Here, an L1-RSRP for panel #1 is higher than an L1-RSRP for panel #2, and a UL transmission power for panel #2 is higher than a UL transmission power for panel #1. The UE uses panel #1 for DL from TRP #1 and uses panel #2 for UL to TRP #2.

[Use Case 2]

The UE uses different UL beams due to UL load balance.

Figure 5:
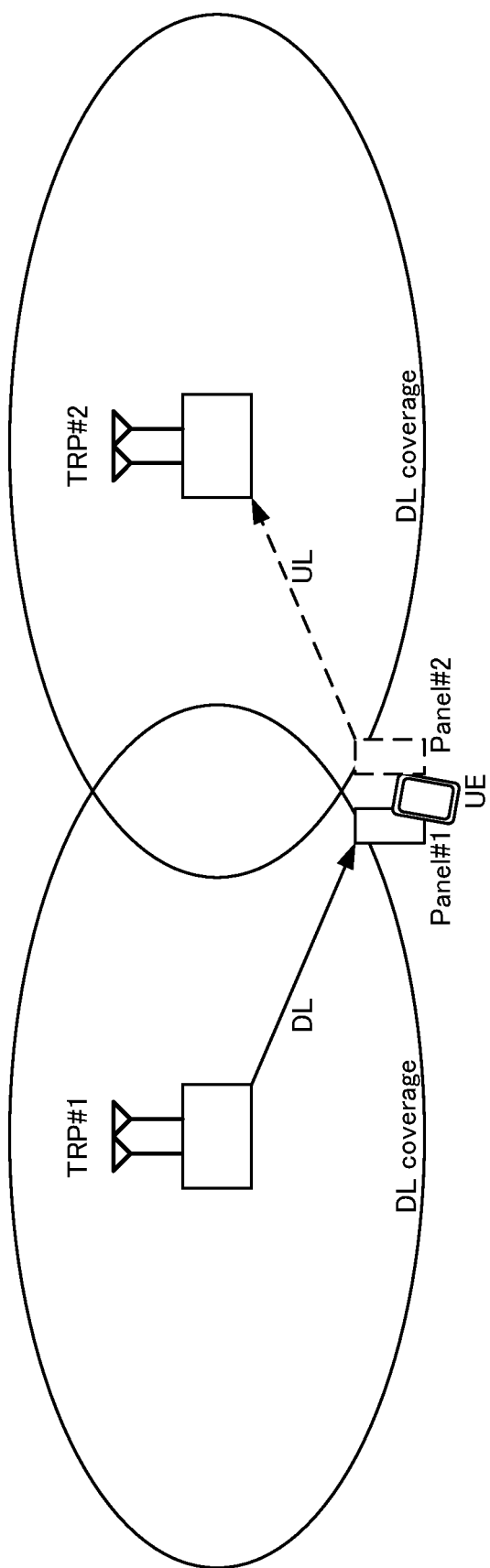
FIG. 5 is a diagram to show an example of a use case 2.

In an example in FIG. 5, an L1-RSRP for panel #1 is higher than an L1-RSRP for panel #, and a UL load on panel

2 is higher than a UL load on panel #1. The UE uses panel #1 for DL from TRP #1 and uses panel #2 for UL to TRP #2.

It is conceivable that more scenarios having different requirements are to be studied. For example, in multi-TRP transmission, high speed train (HST) transmission, inter-cell mobility while the UE possibly connects to two cells, and the like, the common beam for each TRP or cell may be different.

In this case, the UE may include multi-panel for FR2. In this case, the common beam may be different for each UE panel.

The DCI level beam indication the (beam indication based on the DCI) for the common beam/unified TCI state framework is more promising than the MAC CE level beam indication (the beam indication based on the MAC CE). The default beam in Rel. 16 enables the MAC CE level indication for the common beam/unified TCI state framework. Currently, the DCI cannot switch the common beam.

If the common beam is updated by the DCI and the common beam is applied to the PDCCH, that is, if the DCI updates a PDCCH beam, the following problems should be studied.

In a case that the DCI indicating the common beam is failed to be received, there is a common beam mix-up between the UE and the base station.

It is preferable to update the common beam after the UE transmits feedback for the DCI indicating the update of the common beam. From an effect on specifications, it is preferable that a timeline for the update of the common beam is defined, and the common beam is updated after the UE transmits the feedback. If the DCI indicating the update of the common beam is a DL assignment, the feedback may be transmission of ACK or NACK of PDSCH. If the DCI indicating the update of the common beam is a UL grant, the feedback may be PUSCH transmission.

In timelines in following Examples 1 and 2, how to indicate the beam/TCI state of PDSCH/PUCCH/PUSCH before updating the common beam is an issue.

Example 1

Figure 6:
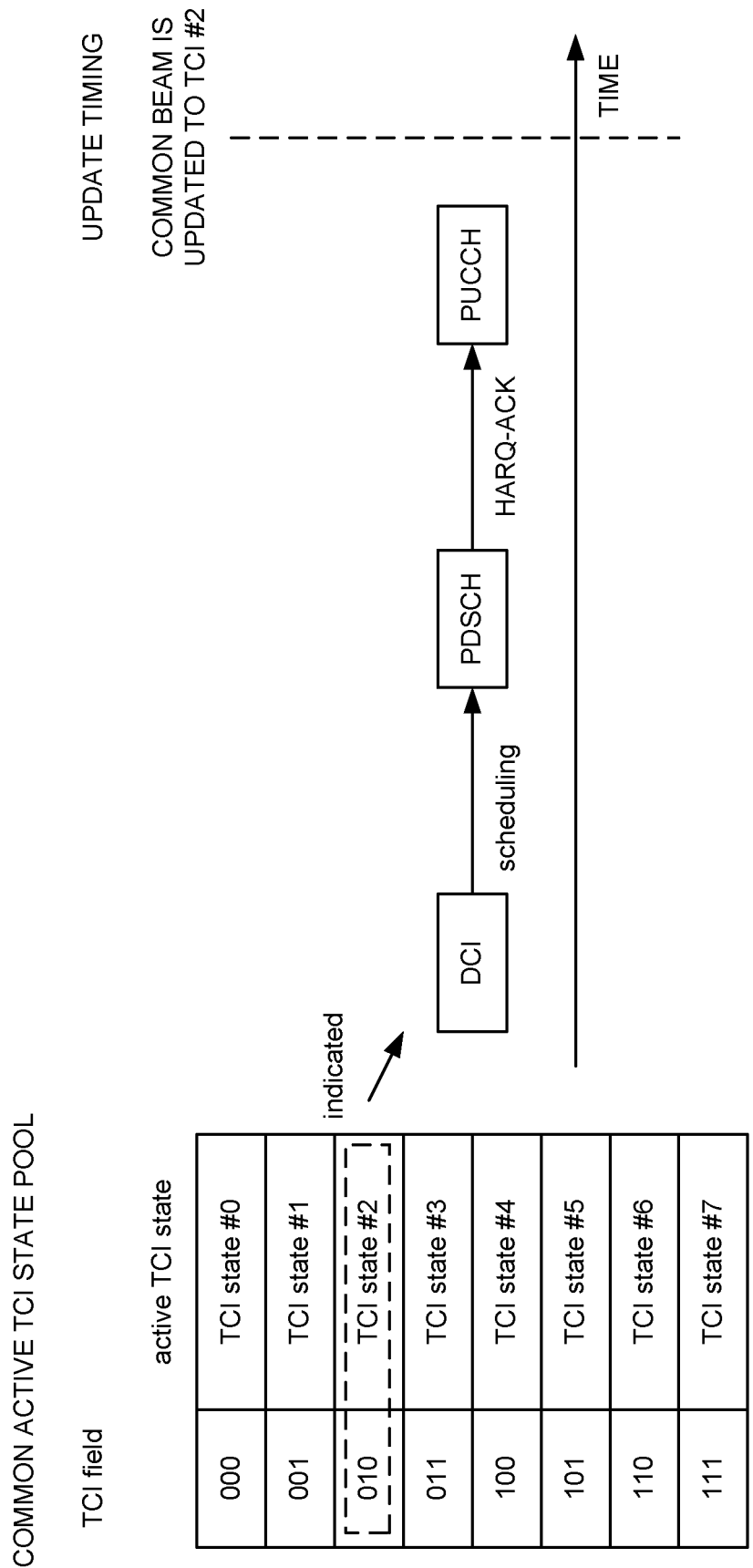
FIG. 6 is a diagram to show an example of a timeline in Example 1.

In an example in FIG. 6, a common active TCI state pool (list) including TCI states #0 to #7 is configured/activated by the RRC/MAC CE. TCI states #0 to #7 are associated with values 000 to 111 in a TCI field, respectively.

The UE receives DCI (DL assignment) indicating TCI #2 in the common active TCI state pool. After that, the UE receives a PDSCH scheduled by the DCI. After that, the UE transmits HARQ-ACK information responding to the PDSCH in a PUCCH. After that, the common beam is updated to TCI #2, and applied to the all channels.

Here, which beam is used in the PDSCH/PUCCH is an issue.

Example 2

Figure 7:
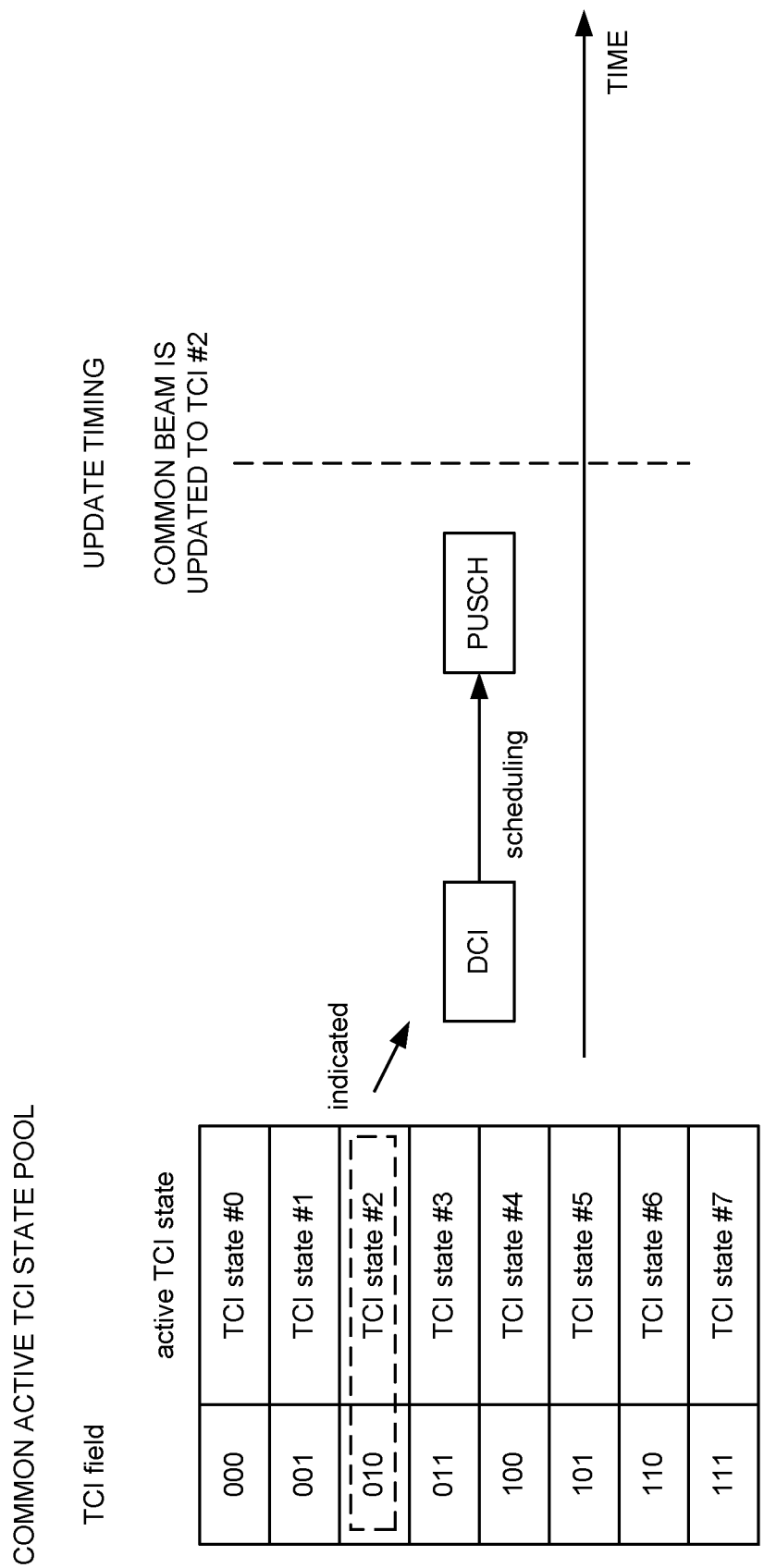
FIG. 7 is a diagram to show an example of a timeline in Example 2.

In an example in FIG. 7, a common active TCI state pool (list) similar to that in FIG. 6 is configured/activated by the RRC/MAC CE.

The UE receives DCI (UL grant) indicating TCI #2 in the common active TCI state pool. After that, the UE transmits a PUSCH scheduled by the DCI. After that, the common beam is updated to TCI #2, and applied to the all channels.

Here, which beam is used in the PDSCH is an issue.

If the beam/TCI state of PDSCH/PUCCH/PUSCH is not clear before updating the common beam, communication quality deterioration, throughput deterioration, or the like may be involved.

Thus, the inventors of the present invention came up with the idea of a method for indicating a TCI state.

Hereinafter, embodiments according to the present disclosure will be described in detail with reference to the drawings. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, ID, in indicator, and a resource ID may be interchangeably interpreted. In the present disclosure, "support," "control," "can control," "operate," and "can operate" may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, for example, the higher layer signaling may be any one or combinations of Radio Resource Control (RRC) signaling, Medium Access Control (MAC) signaling, broadcast information, and the like. In the present disclosure, RRC, RRC signaling, RRC parameter, higher layer, higher layer parameter, RRC information element (IE), and RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE receive beam, a DL beam, a DL receive beam, a DL precoding, a DL precoder, a DL-RS, a QCL type D RS in TCI state/QCL assumption, a QCL type A RS in TCI state/QCL assumption, a spatial relation, a spatial domain transmission filter, a UE spatial domain transmission filter, a UE transmit beam, a UL beam, a UL transmit beam, a UL precoding, a UL precoder, and a PL-RS may be interchangeably interpreted. In the present disclosure, a QCL type X-RS, a DL-RS associated with a QCL type X, a DL-RS having a QCL type X, a source of a DL-RS, an SSB, a CSI-RS, and an SRS may be interchangeably interpreted.

UL DCI, DCI scheduling a UL channel (PUSCH), and DCI format 0_x (x=0, 1, 2, . . . ) may be interchangeably interpreted. DL DCI, DCI scheduling a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, link direction, downlink (DL), uplink (UL), and one of UL and DL may be interchangeably interpreted.

In the present disclosure, a pool, a set, a group, and a list may be interchangeably interpreted.

In the present disclosure, a common beam, a unified TCI state, a beam applicable to DL and UL, a beam applied to a plurality (plurality of kinds) of channels/RSs, and a PL-RS may be interchangeably interpreted.

In the present disclosure, a plurality of TCI states configured by the RRC, a plurality of TCI states activated by the MAC CE, a pool, a TCI state pool, an active TCI state pool, a common TCI state pool, a joint TCI state pool, and a separate TCI state pool may be interchangeably interpreted.

(Radio Communication Method)

Hereinafter, at least one embodiment may be applied to at least one of the following cases 1 to 3.

[Case 1]

After the RRC configuration for the common beam, and before the MAC CE activation, the beam assumption may be any of the following Assumptions 1-1 to 1-3.

[[Assumption 1-1]] The beam assumption is the lowest or highest TCI state ID in a configured common TCI pool.

[[Assumption 1-2]] The rule in Rel. 15/16 is used for the beam assumption. The beam assumption may be a QCL assumption of an SSB/CSI-RS associated with the most recent PRACH.

[[Assumption 1-3]] The beam management in Rel. 15/16 is additionally used for the beam assumption. The beam assumption may be the configured/indicated TCI state/spatial relation in Rel. 15/16.

In an example in FIG. 8A, Assumption 1-1 is used. The beam assumption is the lowest TCI state ID in the configured common TCI pool.

[Case 2]

After the MAC CE activation for the common pool, and before the DCI indication, the beam assumption may be any of the following Assumptions 2-0 to 2-3.

[[Assumption 2-0]] The beam assumption is an active TCI state corresponding to the lowest or highest codepoint in the TCI field of the DCI.

[[Assumption 2-1]] The beam assumption is the lowest or highest active TCI state ID in the configured common active TCI pool.

[[Assumption 2-2]] The rule in Rel. 15/16 is used for the beam assumption. The beam assumption may be a QCL assumption of an SSB/CSI-RS associated with the most recent PRACH.

[[Assumption 2-3]] The beam management in Rel. 15/16 is additionally used for the beam assumption. The beam assumption may be the configured/indicated TCI state/spatial relation in Rel. 15/16.

In an example in FIG. 8B, Assumption 2-1 is used. The beam assumption is the lowest TCI state ID in the activated common TCI pool.

[Case 3]

The DCI already indicates the common beam, and another piece of DCI indicates change of the common beam. After that another piece of DCI, and before a beam change time, the beam assumption may conform to a first embodiment.

First Embodiment

In the common beam/unified TCI state framework, a plurality of TCI states (pool) may be activated by the MAC CE/RRC, one unified TCI state may be selected by the DCI, and the selected DCI may be applied to a plurality or all of UL/DL channels/RSs at or after a timing A.

The beam assumption for at least one of the PDSCH, the PUCCH/PUSCH carrying the HARQ-ACK information of the PDSCH scheduled/triggered by the DL DCI indicating update of the common beam for the PDSCH, the PUSCH scheduled/triggered by the UL DCI indicating update of the common beam, and the SRS triggered by the UL/DL DCI indicating update of the common beam may be any of the following Aspects 1-1 and 1-2.

<<Aspect 1-1>>

An immediately preceding (before update) common beam. The immediately preceding common beam may be a TCI state applied to DCI (PDCCH) indicating the update of the common beam, or a TCI state applied to a channel (PDSCH/PUCCH/PUSCH) before the DCI.

<<Aspect 1-2>>

A beam indicated by the DCI indicating the update of the common beam. This DCI may conform to any of the following Aspects 1-2-1 and 1-2-2.

[Aspect 1-2-1]

Figure 9:
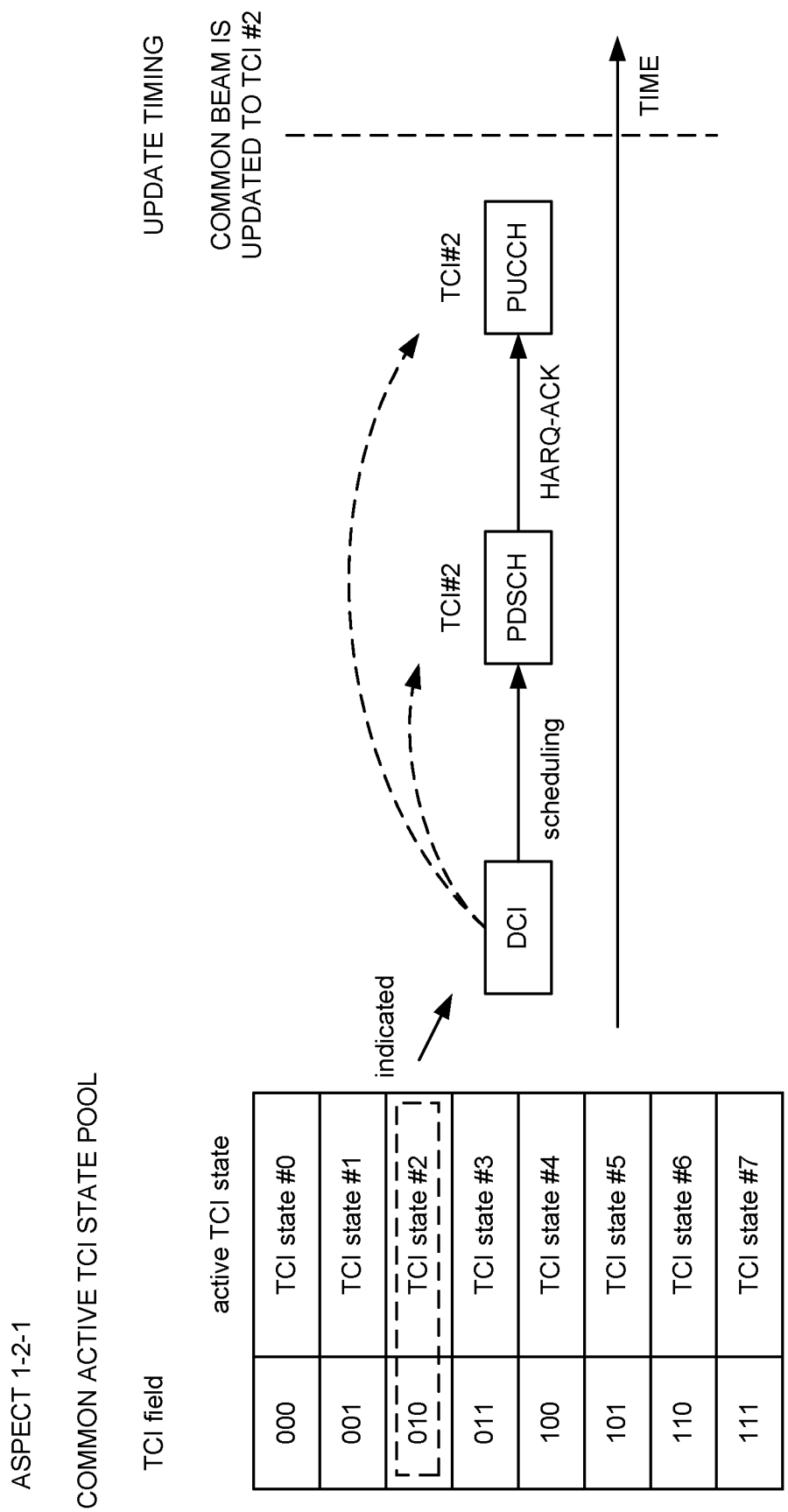
FIG. 9 is a diagram to show an example of Aspect 1-2-1.

The DCI field indicating the common beam may be used to indicate the beam for PDSCH/PUCCH/PUSCH. In an example in FIG. 9, the UE receives the DCI and the PDSCH, and transmits the PUCCH, similarly to FIG. 6. The beam used for the PDSCH reception and the PUCCH transmission may be TCI #2.

[Aspect 1-2-2]

Figure 10:
FIG. 10 is a diagram to show an example of Aspect 1-2-2.

A DCI field different from the DCI field indicating the common beam may be used to indicate the beam for PDSCH/PUCCH/PUSCH. In an example in FIG. 10, the UE receives the DCI and transmits the PUSCH, similarly to FIG. 7. The beam used for the PUSCH transmission may be different from TCI #2, and may be indicated by a TCI field different from the field indicating the common beam.

The first embodiment may be applied to a case that a time offset between DCI indicating the unified TCI state and a channel (PDSCH/PUSCH) scheduled by the DCI is equal to or more than a threshold.

According to the first embodiment described above, the UE and the base station can use an appropriate beam from the DCI indicating the common beam until the update of the common beam.

Second Embodiment

In a case that Aspect 1-2 is used, a TCI state of a PDSCH scheduled by DCI is indicated by the DCI.

Before decoding the DCI, the UE is required to buffer a received signal by using a QCL assumption/TCI state, which is an issue. This is a reason why a default QCL assumption of PDSCH is supported in Rel. 15.

Figure 11:
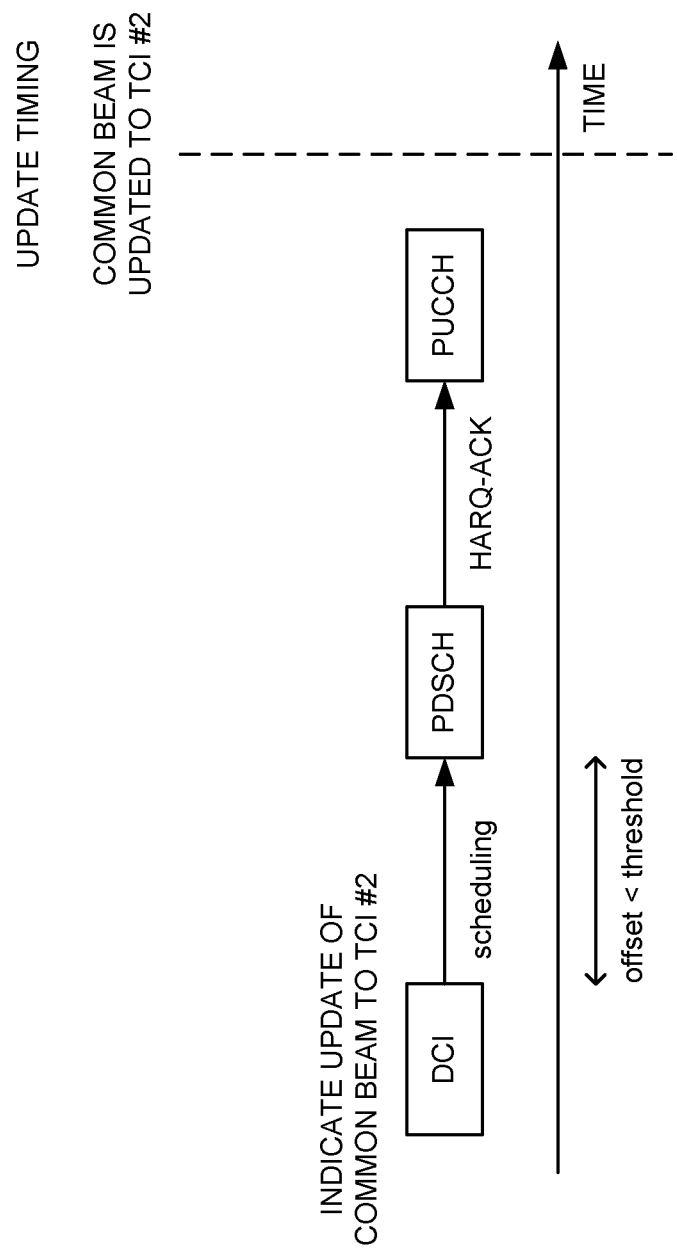
FIG. 11 is a diagram to show an example of a case that a time offset between DCI and a PDSCH scheduled by the DCI is smaller than a threshold.

As such, a study is underway to use a default QCL assumption of a PDSCH for buffering the received signal in a case that a time offset between DCI and a PDSCH scheduled by the DCI is smaller than a threshold similarly to Rel. 15, as in an example in FIG. 11.

A TCI state of a CORESET having the lowest ID may not be possibly optimal. A better means is studied for definition of the unified TCI state framework.

The threshold for the offset from the DCI to the PDSCH/ from the DCI to the PUSCH may be the QCL time length (timeDurationForQCL) in Rel. 15, a new UE capability parameter reported by the UE, or a new RRC parameter configured by the base station.

If the time offset between the DL DCI and the PDSCH or the time offset between the UL DCI and the PUSCH is smaller than the threshold, the beam assumption for at least one of the PDSCH, the HARQ-ACK information on the PUCCH/PUSCH, and PUSCH may conform to at least one of the following Aspects 2-1 to 2-4, and Variations 1 and 2 of Aspect 2-4.

<<Aspect 2-1>>

The beam assumption is the default QCL assumption. The default QCL assumption may be the definition in Rel. 15/16, or the default beams redefined in Rel. 17 or later versions. The all UL/DL default beams may be aligned. For example, the default beam may be a QCL type D RS having the lowest CORESET ID.

<<Aspect 2-2>>

An immediately preceding (before update) common beam is used for the beam assumption for at least one of reception of PDSCH, transmission of HARQ-ACK information on PUCCH/PUSCH, and transmission of PUSCH. The immediately preceding common beam may be a TCI state applied to DCI (PDCCH) indicating the update of the common beam, or a TCI state applied to a channel (PDSCH/PUCCH/PUSCH) before the DCI.

Figure 12:
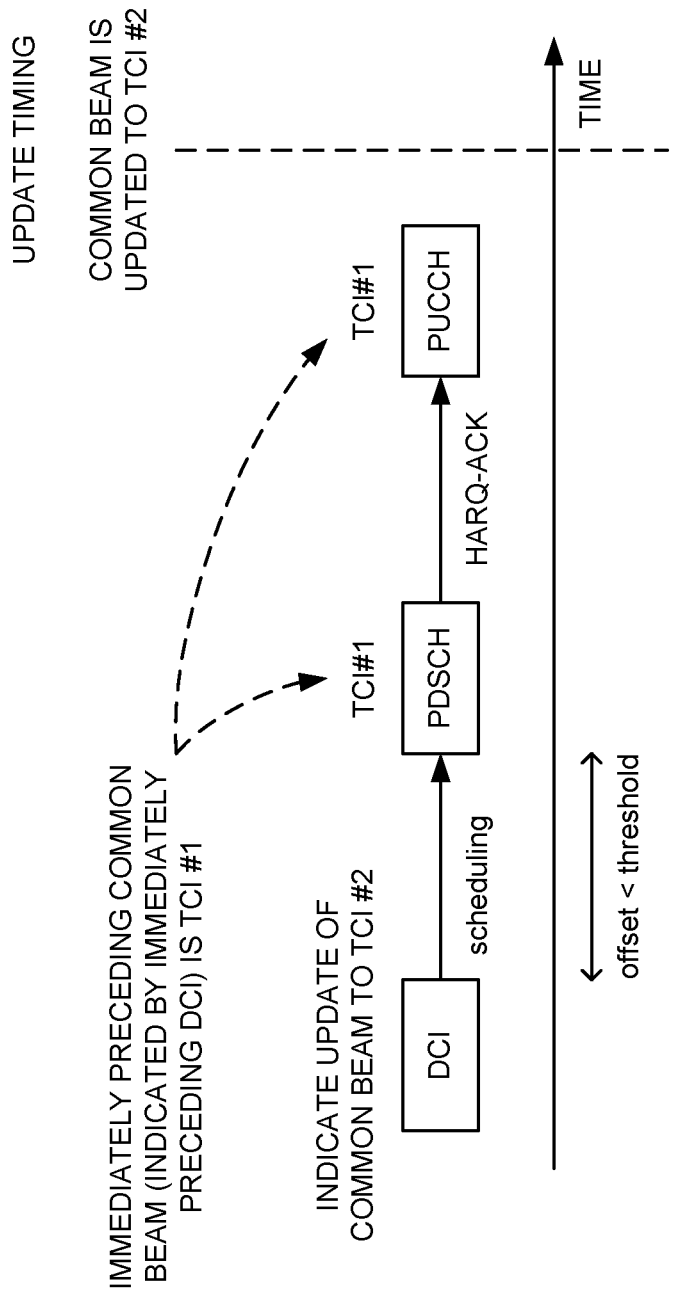
FIG. 12 is a diagram to show an example of Aspect 2-2.

In an example in FIG. 12, the UE receives the DCI and the PDSCH, and transmits the PUCCH, similarly to FIG. 6. The time offset between the DCI and the PDSCH is smaller than the threshold. The immediately preceding (before update) common beam (the common beam indicated by immediately preceding DCI) is TCI #1. The DCI indicates updating the common beam to TCI #2. The UE uses TCI #1 for the PDSCH reception and the PUCCH transmission.

<<Aspect 2-3>>

The beam assumption is a default TCI state selected by the common (joint)/separate TCI state pool for the unified TCI state framework.

The default TCI state may conform to the rule. The rule may be the lowest or highest TCI state ID in the active TCI state pool.

The default TCI state may be configured by the higher layer. A default TCI state index per active TCI state pool may be configured by the higher layer.

Figure 13A:
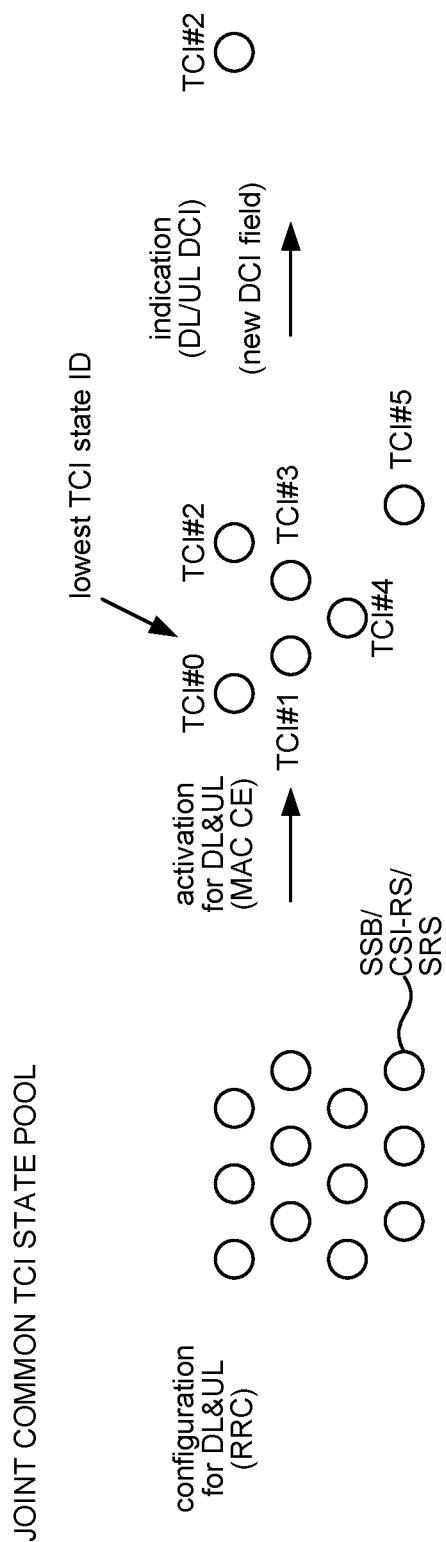
FIGS. 13A and 13B are diagrams to show examples of Aspect 2-3.
Figure 13B:
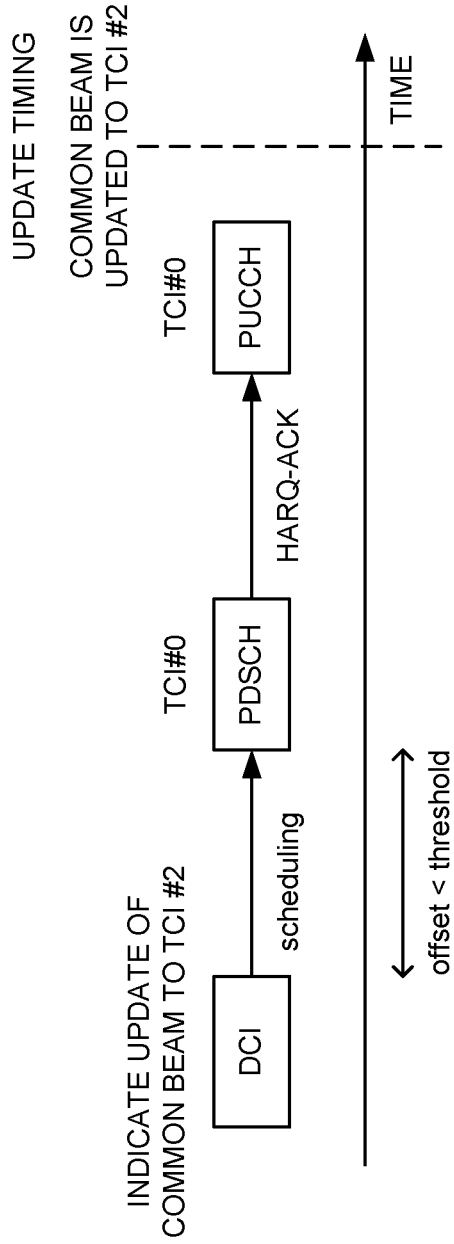

In an example in FIG. 13A, the unified TCI state pools for UL and DL are configured by the RRC, and TCI #0 to TCI #5 in the unified TCI state pool are activated by the MAC CE. The DCI indicates updating the common beam to TCI #2. In an example in FIG. 13B, the UE receives the DCI and the PDSCH, and transmits the PUCCH, similarly to FIG. 6. The time offset between the DCI and the PDSCH is smaller than the threshold. The UE uses TCI #0 corresponding to the lowest TCI state ID among the active TCI states for the PDSCH reception and the PUCCH transmission.

<<Aspect 2-4>>

Both the MAC CE level common TCI state pool and the DCI level common TCI state pool may be configured, and the MAC CE level TCI state pool may be used.

Figure 15:
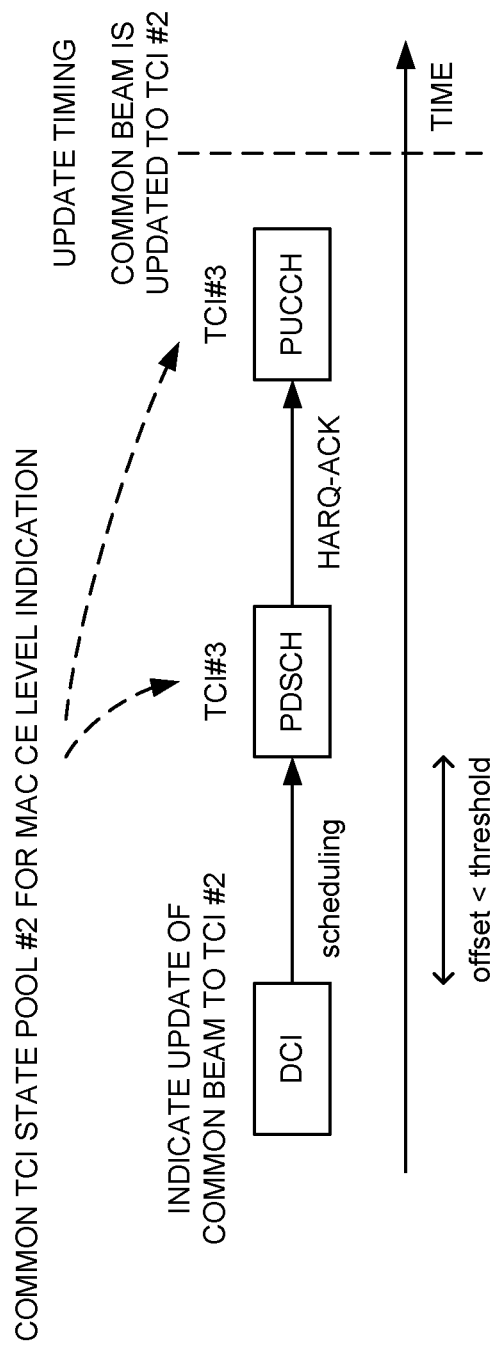
FIG. 15 is a diagram to show an example of a timeline in Aspect 2-4.

In an example in FIG. 14A, unified TCI state pool #1 for the DCI level indication is configured by the RRC, and TCI #0 to TCI #5 in unified TCI state pool #1 are activated by the MAC CE. Furthermore, in an example in FIG. 14B, unified TCI state pool #2 for the MAC CE level indication is configured by the RRC, and TCI #3 in unified TCI state pool #1 is activated by the MAC CE. In an example in FIG. 15, the UE receives the DCI and the PDSCH, and transmits the PUCCH, similarly to FIG. 6. The time offset between the DCI and the PDSCH is smaller than the threshold. The DCI indicates updating the common beam to TCI #2. The UE uses activated TCI #3 in unified TCI state pool #2 for the MAC CE level indication for the PDSCH reception and the PUCCH transmission. Unified TCI state pool #2 for the MAC CE level indication is used to indicate the default QCL assumption for the PDSCH.

<<Variation 1 of Aspect 2-4>>

The UE may use the TCI state activated by the MAC CE from the common TCI state pool for the MAC CE level indication for the PDCCH reception, and may use the TCI state activated/indicated by the MAC CE/DCI from the common TCI state pool for the DCI level indication for the PDSCH reception. The DCI does not update the beam for the DCI, and thus, a problem caused by the PDCCH changing the TCI state of the PDCCH does not occur. The beam for the PDCCH and the beam for the PDSCH may not be common to each other in some cases.

In an example in FIG. 16A, unified TCI state pool #1 for the DCI level indication is configured by the RRC, and TCI #0 to TCI #5 in unified TCI state pool #1 are activated by the MAC CE. Furthermore, in an example in FIG. 16B, unified TCI state pool #2 for the MAC CE level indication is configured by the RRC, and TCI #3 in unified TCI state pool #1 is activated by the MAC CE. The DCI indicates updating the common beam to TCI #2. The UE uses indicated TCI #2 in unified TCI state pool #1 for the DCI level indication for the PDSCH/PUCCH/CSI-RS/PUSCH/SRS. The UE uses activated TCI #3 in unified TCI state pool #2 for the MAC CE level indication for the PDCCH reception.

<<Variation 2 of Aspect 2-4>>

The UE may use the TCI state activated by the MAC CE from the common TCI state pool for the MAC CE level indication for the PDCCH reception, and may use the TCI state activated/indicated by the MAC CE/DCI from the common TCI state pool for the DCI level indication for the PDSCH reception. The DCI does not update the beam for the DCI, and thus, a problem caused by the PDCCH changing the TCI state of the PDCCH does not occur. The beam for the PDCCH and the beam for the PDSCH may not be common to each other in some cases.

The TCI state pool common to the MAC CE level indication and the DCI level indication may be used. The TCI state indicated by the DCI level beam indication may be applied to other than the PDCCH. The TCI state of the PDCCH may be selected from among the TCI states activated by the MAC CE level beam indication in accordance with a rule. For example, the rule may be the lowest or highest TCI state ID.

Figure 17:
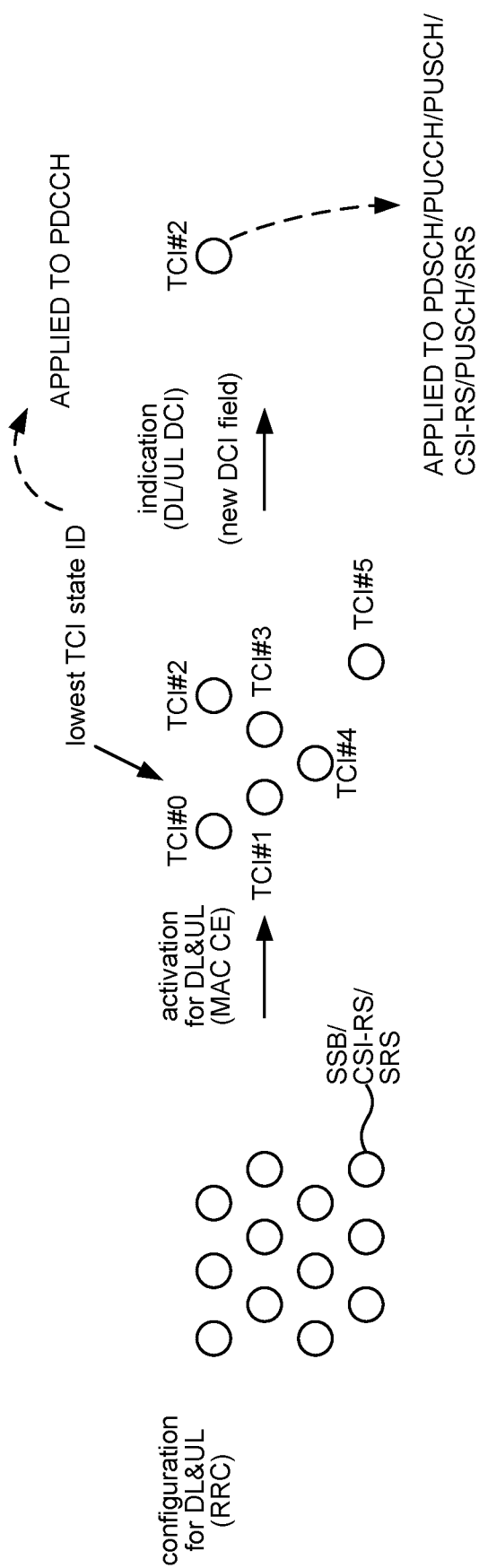
FIG. 17 is a diagram to show an example of Variation 2 of Aspect 2-4.

In an example in FIG. 17, the unified TCI state pool (joint TCI state pool) is configured by the RRC, and TCI #0 to TCI #5 in the unified TCI state pool are activated by the MAC CE. The DCI indicates updating the common beam to TCI #2. The UE uses indicated TCI #2 for the PDSCH/PUCCH/CSI-RS/PUSCH/SRS. The UE uses TCI #0 corresponding to the lowest TCI state ID among the TCI states activated by the MAC CE for the PDCCH reception.

According to Variation 2 of Aspect 2-4, overhead of the higher layer can be further reduced compared to Variation 1 of Aspect 2-4.

According to the second embodiment described above, the UE can appropriately determine the beam even in the case that the time offset is smaller than the threshold.

Third Embodiment

If there is no PDSCH data (DL data)/PUSCH data (UL data) to be transmitted, the base station may transmit DCI for switching the beam. In this case, the base station may schedule a dummy PDSCH/PUSCH for switching the common beam.

New DCI may be used for performing the common beam indication even if there is no PDSCH/PUSCH. The DCI may have a redundancy check (CRC) scrambled by a new RNTI radio network temporary identifier (RNTI).

Special values of some special fields in the DCI format may be used for performing the common beam indication even if there is no PDSCH/PUSCH.

The DCI for the common beam indication may conform to at least one of the following Aspects 3-0 to 3-3.

<<Aspect 3-0>>

A new DCI format may be used to indicate the TCI state in the common TCI state pool.

The new DCI format may be UE-specific DCI, or a group common PDCCH. One indication may be applied to the all UEs in the group in the group common DCI. A plurality of indications may be applied respectively to a plurality of UEs in the group.

The new DCI format may not schedule a PDSCH/PUSCH. A size of the new DCI format may be smaller than a size of existing DCI format 0_1, 0_2, 1_1, or 1_2.

The new DCI format may be extension having new DCI fields based on the existing DCI format. For example, a new DCI field may be the TCI common indication. If the new DCI field TCI common indication is 1, the UE may conform to only the TCI state indication (TCI field) in the new DCI format and may ignore other DCI fields. If the new field TCI common indication is 0, the UE may conform to all DCI fields in the new DCI format (a new RNTI may not be required as in Aspect 3-3 described later). Whether or not the new DCI field exists may be configured through RRC signaling.

<<Aspect 3-1>>

A new RNTI for updating the common TCI state without PDSCH/PUSCH scheduling may be defined and configured for the UE. The new RNTI may be a X-RNTI (special RNTI), or a RNTI other than the existing RNTI. The existing RNTI may include at least one of a C-RNTI, a CS-RNTI, and an MCS-C-RNTI.

The new RNTI may be used to distinguish a UE operation based on UE-specific DCI (special DCI) that is used for the common TCI state (common beam) indication (update) and is not used for the PDSCH/PUSCH scheduling from UE-specific DCI (normal DCI) that is used for the PDSCH/PUSCH scheduling.

DCI (UE-specific DCI) having cyclic redundancy check (CRC) scrambled by the X-RNTI may be referred to as the special DCI. The (UE-specific DCI) having CRC scrambled by the existing RNTI may be referred to as the normal DCI. The UE-specific DCI may be the new DCI format or DCI format 0_1.

In a case that the UE receives/detects the special DCI, the UE may conform to at least one of the following procedures 1 to 3.

[Procedure 1]

The UE may conform to the TCI field in the special DCI and may ignore other fields to update the common TCI state in the special DCI. A size of the TCI field in the special DCI may be the same as a size of the TCI field in the normal DCI.

[Procedure 2]

The number of bits (size) of the TCI field in the special DCI may be larger than the number of bits of the TCI field in the normal DCI. The UE may conform to the TCI field in the special DCI. The UE may ignore other fields in the special DCI.

[Procedure 3]

The special DCI may include a new DCI field for indicating update of the common TCI state. The new DCI field may include fields different for UL and DL or a kind of a channel/RS. Whether or not the new DCI field exists may be configured through RRC signaling.

In Aspect 3-1, the number of bits (size) of the special DCI may be the same as the number of bits of the normal DCI.

Figure 18:
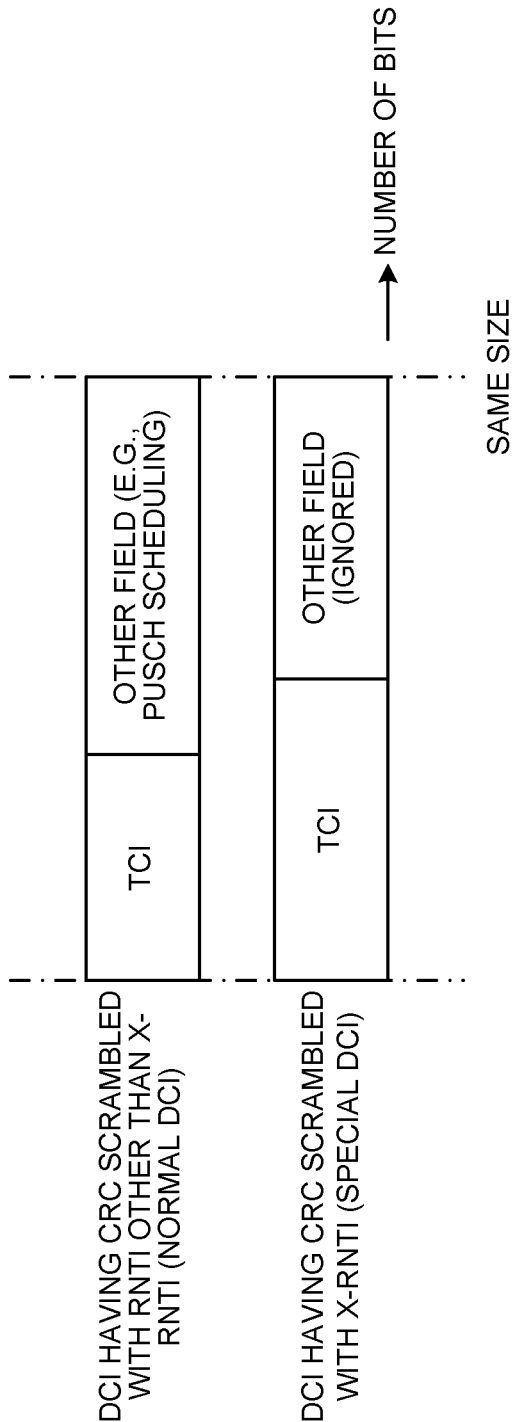
FIG. 18 is a diagram to show an example of Aspect 3-1.

In an example in FIG. 18, a size of the special DCI may be the same as a size of the normal DCI. In accordance with the procedure 2, the size of the TCI field in the special DCI may be larger than the size of the TCI field in the normal DCI. The UE may interpret other fields than the TCI field in the normal DCI (for example, PUSCH scheduling). The UE may ignore other fields than the TCI field in the special DCI.

<<Aspect 3-2>>

The UE may receive the UE-specific DCI having CRC scrambled by the existing RNTI (Rel. 15/16). The existing RNTI may be at least one of a C-RNTI, a CS-RNTI, and an MCS-C-RNTI. The new RNTI may be not be required. In a case that some special values of some special fields in the DCI are decoded, the UE may consider the DCI as DCI (special DCI) that is used to update the common TCI state and is not used to schedule the PDSCH/PUSCH. Not in the above case, the UE may consider the DCI as DCI (normal DCI) that is used to schedule the PDSCH/PUSCH.

In the special DCI format, at least one of the special values of the special fields below may be defined as an implicit indication (confirmation, validation) of the special DCI. The special DCI format may be at least one of DCI formats 0_1, 0_2, 1_1, 1_2, and 2_3.

A value of a frequency domain resource allocation field is set to all 0 or all 1.

A value of a time domain resource allocation field is set to all 0 or all 1.

A value of a frequency hopping flag field is set to all 0 or all 1.

A value of a modulation and coding scheme (MCS) field is set to all 0 or all 1.

A value of a new data indicator (NDI) field is set to all 0 or all 1.

A value of redundancy version field is set to all 0 or all 1.

A value of a HARQ process number field is set to all 0 or all 1.

A value of a downlink assignment indicator (DAI) field is set to all 0 or all 1.

A value of a PUSCH transmission power control (TPC) command field is set to all 0 or all 1.

A value of an SRS resource indicator field is set to all 0 or all 1.

A value of a precoding information and number of layers field is set to all 0 or all 1.

A value of an antenna port field is set to all 0 or all 1.

A value of a CSI request field is set to all 0 or all 1.

Different combinations of values may be defined for different cases.

In Aspect 3-2, at least one of one or more DCI fields (the special DCI field) or the DCI field configured by the higher layer may indicate that the DCI is the special DCI.

In a case that the UE receives/detects the special DCI, the UE may conform to at least one of the following procedures 1 to 3.

[Procedure 1]

The UE may conform to the TCI field in the special DCI and may ignore other fields to update the common TCI state in the special DCI. A size of the TCI field in the special DCI may be the same as a size of the TCI field in the normal DCI.

[Procedure 2]

The number of bits (size) of the TCI field in the special DCI may be larger than the number of bits of the TCI field in the normal DCI. The UE may conform to the TCI field in the special DCI. The UE may ignore other fields in the special DCI.

[Procedure 3]

The special DCI may include a new DCI field for indicating update of the common TCI state. The new DCI field may include fields different for UL and DL or a kind of a channel/RS.

In Aspect 3-2, the number of bits (size) of the special DCI may be the same as the number of bits of the normal DCI.

Figure 19:
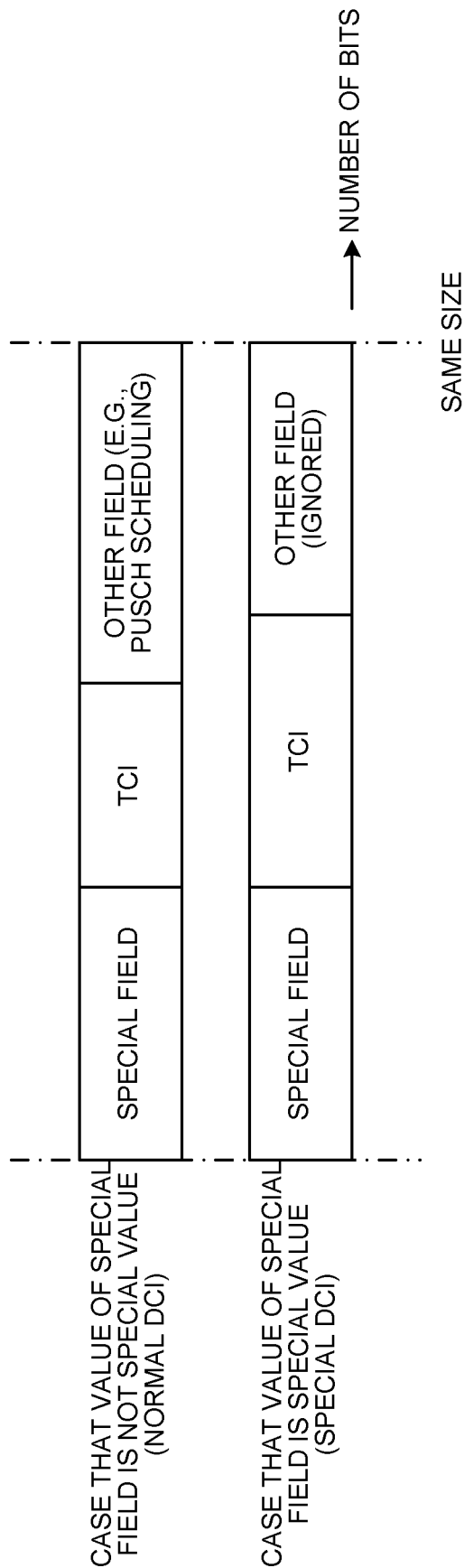
FIG. 19 is a diagram to show an example of Aspect 3-2.

In an example in FIG. 19, each of the special DCI and the normal DCI may include the special DCI field, the TCI field, and other fields. A size of the special DCI may be the same as a size of the normal DCI. The special DCI field in the special DCI may indicate the special value, and the special DCI field in the normal DCI may not indicate the special value. In accordance with the procedure 2, the size of the TCI field in the special DCI may be larger than a size of the SRS request field in the normal DCI. The UE may interpret other fields than the TCI field in the normal DCI (for example, PUSCH scheduling). The UE may ignore other fields than the TCI field in the special DCI.

<<Aspect 3-3>>

New RRC signaling (higher layer parameter) may be configured which indicates whether the UE-specific DCI is not used to schedule the PDSCH/PUSCH (or, there is no DL data/UL data) and is used or not to update the common TCI state.

If the new RRC signaling is configured, at least one of Aspects 3-0 to 3-2 may be applied.

Only in the case that the higher layer parameter is configured, the UE may receive/detect the special DCI. The special DCI may not schedule the PDSCH/PUSCH, but only update the common TCI state. In not the above case, the UE may perform the operations in Rel. 15/16. In other words, the UE may receive/detect the DCI (normal DCI) for updating the common TCI state and scheduling the PDSCH/PUSCH.

According to the third embodiment described above, the UE can appropriately receive the special DCI.

Fourth Embodiment

The UE capability corresponding to at least one of the functions (features) according to the first to third embodiments may be defined. In a case that the UE reports the UE capability, the UE may perform a corresponding function. In a case that the UE reports the UE capability and is configured with a higher layer parameter corresponding to the function, the UE may perform the corresponding function. A higher layer parameter (RRC information element) corresponding to the function may be defined. In a case that the higher layer parameter is configured, the UE may perform a corresponding function.

The UE capability may indicate whether or not the UE supports the function.

The UE capability may indicate the maximum number of TCI states (in the pool) configured for the UE by the RRC. The number may be reported for the all UL and DL, or individually for each of the UL and DL.

The UE capability may indicate the maximum number of active TCI states the UE supports. The number may be reported for the all UL and DL, or individually for each of the UL and DL.

The UE capability may indicate whether or not the UE supports the different active TCI state pools for UL and DL.

The UE capability may indicate whether or not the UE supports the default QCL assumption. The UE capability may indicate whether or not the UE supports that the time offset of the PDSCH/PUSCH scheduling is smaller than the threshold.

The UE capability may indicate whether or not the UE supports the UE-specific DCI (special DCI) that is not used to schedule the PDSCH/PUSCH (or, there is no DL data/UL data) and is used to indicate (update) the common TCI state.

According to the fourth embodiment describe above, the UE can achieve the above functions while maintaining compatibility with the existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 20:
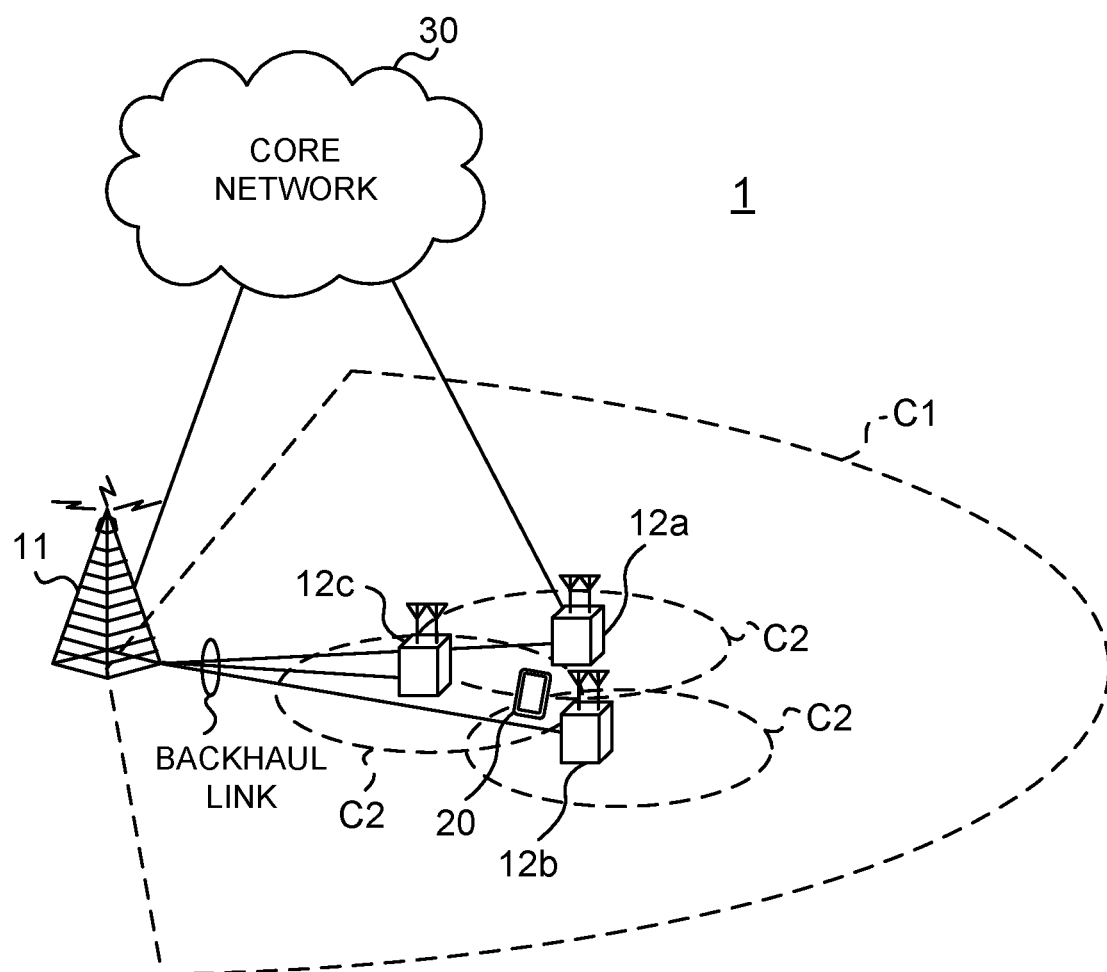
FIG. 20 is a diagram to show an example of a schematic structure of a radio communication system according to one embodiment.

FIG. 20 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 21:
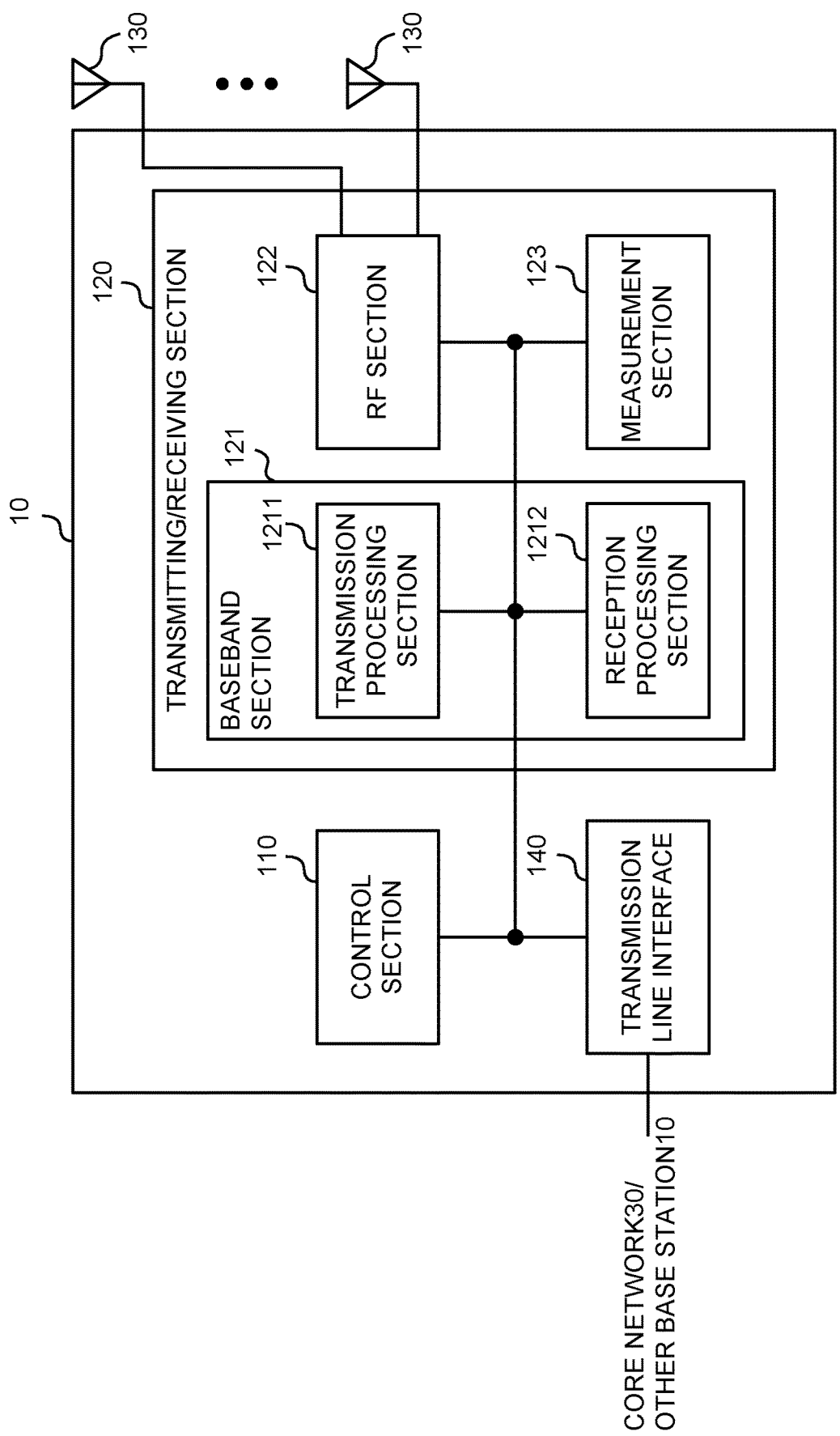
FIG. 21 is a diagram to show an example of a structure of a base station according to one embodiment.

FIG. 21 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit TCI state information indicating a plurality of transmission configuration indication (TCI) states applicable to a plurality of kinds of channels. The control section 110 may determine a first TCI state applied to a signal after the one or more channels and determine a second TCI state applied to the one or more channels to control transmission of downlink control information indicating the first TCI state.

The transmitting/receiving section 120 may transmit first TCI state information indicating a plurality of transmission configuration indication (TCI) states applicable to a plurality of kinds of channels to transmit downlink control information indicating a first TCI state of the plurality of TCI states and resources of one or more channels. The control section 110 may apply a second TCI state to the one or more channels and apply the first TCI state to a signal after the one or more channels, in a case that a time offset between the downlink control information and one of the one or more channels is smaller than a threshold.

The transmitting/receiving section 120 may transmit TCI state information indicating a plurality of transmission configuration indication (TCI) states applicable to a plurality of kinds of channels. The control section 110 may control transmission of downlink control information indicating one of the plurality of TCI states and not scheduling a channel.
(User Terminal)

Figure 22:
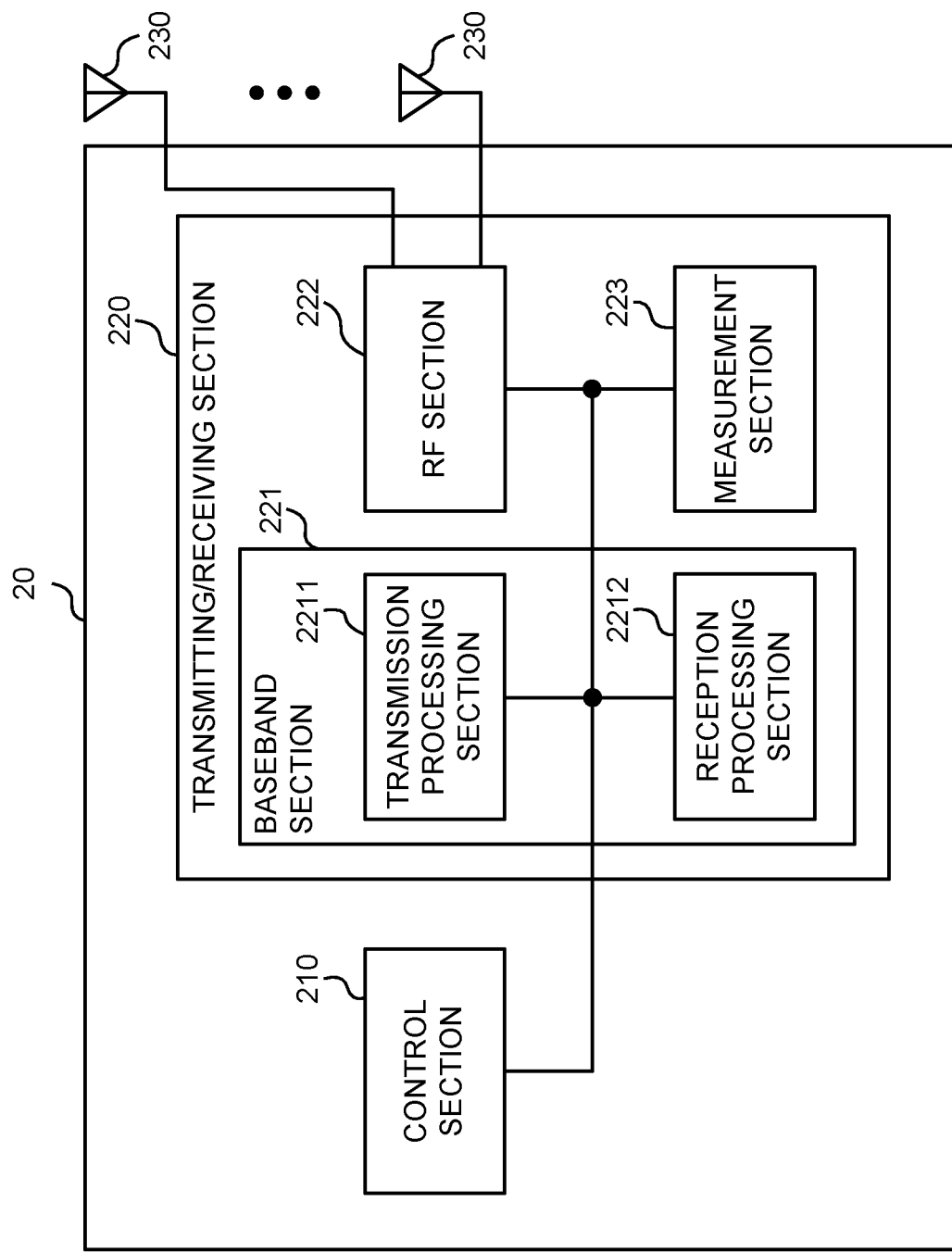
FIG. 22 is a diagram to show an example of a structure of a user terminal according to one embodiment.

FIG. 22 is a diagram to show an example of a structure of the user terminal according to one embodiment. The user terminal 20 includes a control section 210, a transmitting/receiving section 220, and transmitting/receiving antennas

230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive TCI state information (the common TCI state pool configured/indicated by the RRC/MAC CE) indicating a plurality of transmission configuration indication (TCI) states applicable to a plurality of kinds of channels (UL/DL) and receives downlink control information indicating resources (scheduling) of one or more channels (PDSCH/PUCCH/PUSCH). The control section 210 may determine a first TCI state applied to a signal (channel/RS) after the one or more channels (update timing) and determine a second TCI state applied to the one or more channels, on the basis of the TCI state information and the downlink control information.

Each of the first TCI state and the second TCI state may be indicated by the downlink control information, and may be one TCI state of the plurality of TCI states.

The first TCI state may be indicated by a first field in the downlink control information, and may be one TCI state of the plurality of TCI states. The second TCI state may be indicated by a second field in the downlink control information.

The first TCI state may be indicated by the downlink control information, and may be one TCI state of the plurality of TCI states. The second TCI state may be indicated by another piece of downlink control information before the downlink control information.

The transmitting/receiving section 220 may receive a first TCI state information (the common TCI state pool configured/indicated by the RRC/MAC CE) indicating a plurality of transmission configuration indication (TCI) states applicable to a plurality of kinds of channels (UL/DL) and receive downlink control information indicating the first TCI state of the plurality of TCI states and resources (scheduling) of one or more channels (PDSCH/PUCCH/PUSCH). The control section 210 may apply a second TCI state to the one or more channels and apply the first TCI state to a signal (channel/RS) after the one or more channels (update timing), in a case that a time offset between the downlink control information and one of the one or more channels is smaller than a threshold.

The second TCI state may be indicated by another piece of downlink control information before the downlink control information.

The second TCI state may be one TCI state of the plurality of TCI states, the one TCI state meeting a condition.

The transmitting/receiving section 220 may receive a medium access control (MAC) control element (CE) indicating the second TCI state.

The transmitting/receiving section 220 may receive TCI state information (the common TCI state pool configured/indicated by the RRC/MAC CE) indicating a plurality of transmission configuration indication (TCI) states applicable to a plurality of kinds of channels (UL/DL) to receive downlink control information. The control section 210 may determine one of the plurality of TCI states on the basis of the downlink control information and may not use the downlink control information for scheduling a channel (PDSCH/PUSCH).

Whether or not the downlink control information is used for the scheduling may be determined based on at least one of a radio network temporary identifier used for the downlink control information and a value of a field in the downlink control information.

In a case that it is determined that the downlink control information is used for the scheduling, the control section may ignore fields other than a field of the TCI state in the downlink control information.

A size of the field of the TCI state in the downlink control information not used for the scheduling may be larger than a size of a field of the TCI state in the downlink control information used for the scheduling.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 23:
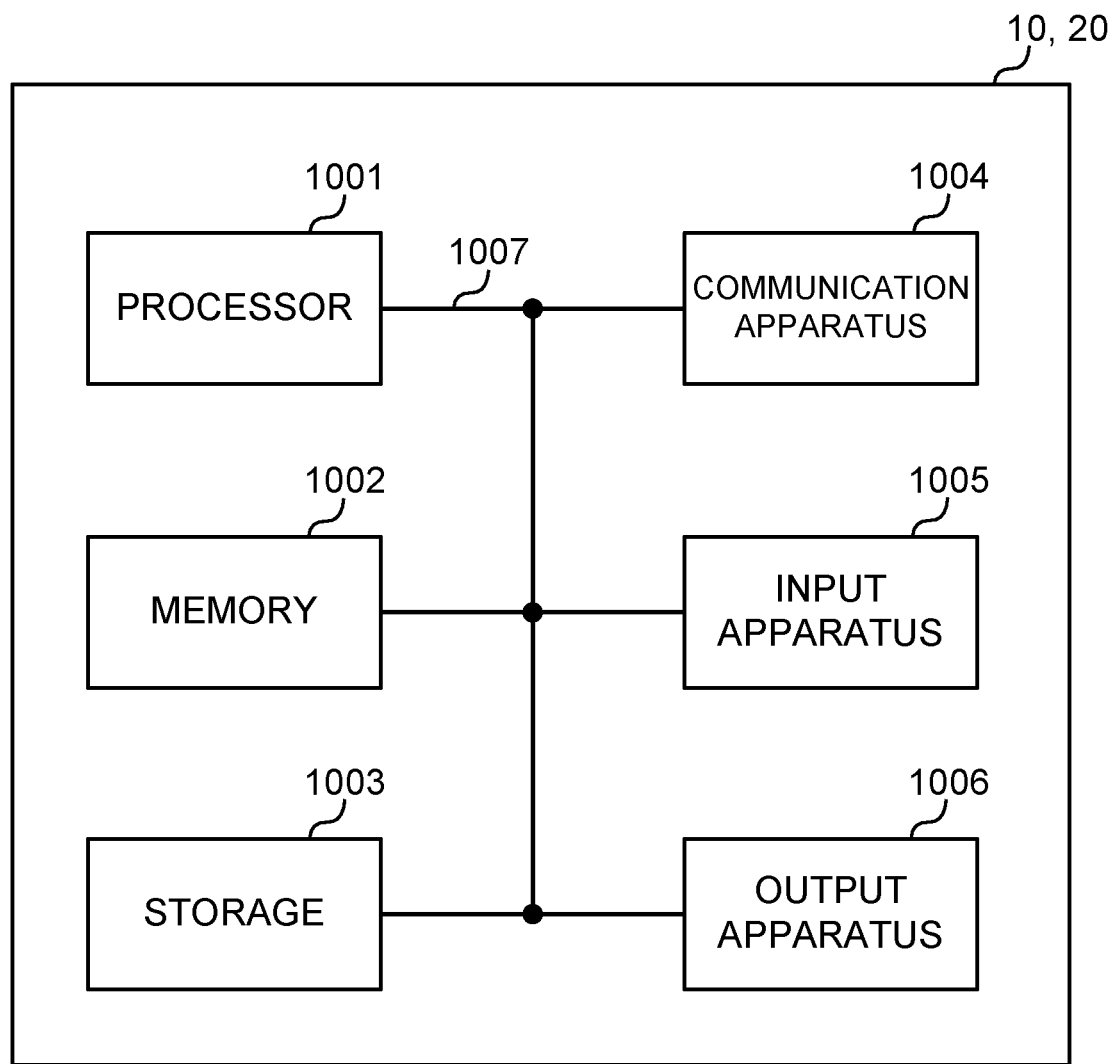
FIG. 23 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 23 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x represents an integer or a decimal, for example)), Future Radio Access (FRA), New-Radio Access Technology (RAT), New Radio (NR), New radio access (NX), Future generation radio access (FX), Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives downlink control information (DCI) indicating one or more transmission configuration indication (TCI) states out of multiple TCI states that are applicable to multiple types of channels; and
a processor that determines whether or not the DCI is used for channel scheduling, based on at least one of a radio network temporary identifier (RNTI) used for the DCI and values of multiple fields in the DCI,
wherein when the RNTI used for the DCI is a CS-RNTI, and in the DCI, a value of a redundancy version (RV) field is set to all 1, a value of a modulation and coding scheme (MCS) field is set to all 1, a value of a new data indicator (NDI) field is set to all 0, and a value of a frequency domain resource allocation (FDRA) field is set to all 0 or all 1, the processor determines that the DCI is not used for the channel scheduling.

2. A radio communication method for a terminal, comprising:
receiving downlink control information (DCI) indicating one or more transmission configuration indication (TCI) states out of multiple TCI states that are applicable to multiple types of channels; and
determining whether or not the DCI is used for channel scheduling, based on at least one of a radio network temporary identifier (RNTI) used for the DCI and values of multiple fields in the DCI,
wherein when the RNTI used for the DCI is a CS-RNTI, and in the DCI, a value of a redundancy version (RV) field is set to all 1, a value of a modulation and coding scheme (MCS) field is set to all 1, a value of a new data indicator (NDI) field is set to all 0, and a value of a frequency domain resource allocation (FDRA) field is set to all 0 or all 1, the DCI is determined not to be used for the channel scheduling.

3. A base station comprising:
a transmitter that transmits downlink control information (DCI) indicating one or more transmission configuration indication (TCI) states out of multiple TCI states that are applicable to multiple types of channels; and
a processor that determines, based on whether or not the DCI is used for channel scheduling, at least one of a radio network temporary identifier (RNTI) used for the DCI and values of multiple fields in the DCI,
wherein when the RNTI used for the DCI is a CS-RNTI, and in the DCI, a value of a redundancy version (RV) field is set to all 1, a value of a modulation and coding scheme (MCS) field is set to all 1, a value of a new data indicator (NDI) field is set to all 0, and a value of a frequency domain resource allocation (FDRA) field is set to all 0 or all 1, the processor determines that the DCI is not used for the channel scheduling.

4. A system comprising: a terminal; and a base station, wherein the terminal comprises:
- a receiver that receives downlink control information (DCI) indicating one or more transmission configuration indication (TCI) states out of multiple TCI states that are applicable to multiple types of channels; and
- a processor that determines whether or not the DCI is used for channel scheduling, based on at least one of a radio network temporary identifier (RNTI) used for the DCI and values of multiple fields in the DCI,
- wherein when the RNTI used for the DCI is a CS-RNTI, and in the DCI, a value of a redundancy version (RV) field is set to all 1, a value of a modulation and coding scheme (MCS) field is set to all 1, a value of a new data indicator (NDI) field is set to all 0, and a value of a frequency domain resource allocation (FDRA) field is set to all 0 or all 1, the processor determines that the DCI is not used for the channel scheduling, and the base station comprises:
- a transmitter that transmits the DCI.

* * * * *